(12) United States Patent
LaRue

(10) Patent No.: US 7,013,313 B1
(45) Date of Patent: Mar. 14, 2006

(54) SYSTEM AND METHODS FOR INHERITING INFORMATION INTO A DATASET

(75) Inventor: Chris LaRue, Santa Cruz, CA (US)

(73) Assignee: Pumatech, Inc., San Jose, CA (US)

( * ) Notice: Subject to any disclaimer, the term of this patent is extended or adjusted under 35 U.S.C. 154(b) by 335 days.

(21) Appl. No.: 09/715,981

(22) Filed: Nov. 17, 2000

Related U.S. Application Data

(60) Provisional application No. 60/167,398, filed on Nov. 24, 1999.

(51) Int. Cl.
*G06F 12/00* (2006.01)

(52) U.S. Cl. .......................... 707/201; 707/8; 707/200; 707/104.1

(58) Field of Classification Search .............. 707/1–10, 707/6, 201, 200–204, 102, 104.1; 709/223, 709/224
See application file for complete search history.

(56) References Cited

U.S. PATENT DOCUMENTS

| | | |
|---|---|---|
| 4,769,796 A | 9/1988 | Levine |
| 4,866,611 A | 9/1989 | Cree et al. |
| 4,881,179 A | 11/1989 | Vincent |
| 4,977,520 A | 12/1990 | McGaughey, III et al. |
| 5,047,918 A | 9/1991 | Schwartz et al. |
| 5,113,380 A | 5/1992 | Levine |
| 5,224,212 A | 6/1993 | Rosenthal et al. |
| 5,390,320 A | 2/1995 | Smithline |
| 5,392,390 A | 2/1995 | Crozier |
| 5,442,783 A | 8/1995 | Oswald et al. |
| 5,519,606 A | 5/1996 | Frid-Nielsen et al. |
| 5,588,147 A | 12/1996 | Neeman et al. |
| 5,600,834 A | 2/1997 | Howard |
| 5,666,530 A | 9/1997 | Clark et al. |
| 5,666,553 A | 9/1997 | Crozier |
| 5,675,802 A | 10/1997 | Allen et al. |
| 5,684,984 A | 11/1997 | Jones et al. |

(Continued)

*Primary Examiner*—Greta Robinson
*Assistant Examiner*—Miranda Le
(74) *Attorney, Agent, or Firm*—Ernest J. Beffel, Jr.; Haynes Beffel & Wolfeld LLP

(57) ABSTRACT

A user is allowed to inherit data from parent datasets into the user's own child dataset. The parent datasets can further inherit data from each other, so that the user can inherit data from a parent dataset, which inherits the data from a grandparent dataset. Such inheritance may be on a record level or on a dataset level, or a combination of the two. For example, a child dataset may inherit a data record from a parent dataset, which inherited that data record from a grandparent dataset on a dataset level, along with all the other records of the grandparent dataset. Pointers are used to keep track of data inheritances and local copies of data may be made as necessary. For example, if a user enters a change to an inherited data record, the child dataset may make a local copy of the data record and enter the change into the local copy. Data may also be synchronized between the child dataset and an alter-ego dataset. In this case, copies of data that have been inherited into the child dataset will be sent to the alter-ego dataset on synchronization. Changes may be made to the child dataset, the parent datasets, or the alter-ego dataset. During subsequent synchronizations, any such changes will undergo conflict and duplicate resolution before entering the changes into the child dataset or propagating the changes to the alter-ego dataset.

26 Claims, 20 Drawing Sheets

U.S. PATENT DOCUMENTS

| | | |
|---|---|---|
| 5,684,990 A | 11/1997 | Boothby |
| 5,701,423 A | 12/1997 | Crozier |
| 5,706,509 A | 1/1998 | Man-Hak Tso |
| 5,710,922 A | 1/1998 | Alley et al. |
| 5,727,202 A | 3/1998 | Kucala |
| 5,729,735 A | 3/1998 | Meyering |
| 5,758,150 A | 5/1998 | Bell et al. |
| 5,758,355 A | 5/1998 | Buchanan |
| 5,761,667 A | 6/1998 | Koeppen |
| 5,778,346 A * | 7/1998 | Frid-Nielsen et al. .......... 705/9 |
| 5,778,389 A | 7/1998 | Pruett et al. |
| 5,813,009 A | 9/1998 | Johnson et al. |
| 5,832,487 A | 11/1998 | Olds et al. |
| 5,845,257 A * | 12/1998 | Fu et al. ................. 705/8 |
| 5,845,293 A | 12/1998 | Veghte et al. |
| 5,870,765 A | 2/1999 | Bauer et al. |
| 5,884,323 A | 3/1999 | Hawkins et al. |
| 5,884,325 A | 3/1999 | Bauer et al. |
| 5,913,214 A | 6/1999 | Madnick et al. |
| 5,926,816 A | 7/1999 | Bauer et al. |
| 5,948,057 A * | 9/1999 | Berger et al. ................. 709/205 |
| 5,956,489 A * | 9/1999 | San Andres et al. ........ 709/221 |
| 5,974,238 A | 10/1999 | Chase, Jr. |
| 5,978,804 A | 11/1999 | Dietzman |
| 6,000,000 A * | 12/1999 | Hawkins et al. ............. 707/201 |
| 6,016,478 A * | 1/2000 | Zhang et al. ................... 705/9 |
| 6,029,178 A | 2/2000 | Martin et al. |
| 6,044,381 A | 3/2000 | Boothby et al. |
| 6,049,809 A | 4/2000 | Raman et al. |
| 6,061,683 A * | 5/2000 | Alonso ......................... 707/8 |
| 6,141,664 A * | 10/2000 | Boothby ..................... 707/201 |
| 6,212,529 B1 | 4/2001 | Boothby et al. |
| 6,289,357 B1 * | 9/2001 | Parker ....................... 707/202 |
| 6,295,541 B1 * | 9/2001 | Bodnar et al. .............. 707/203 |
| 6,493,720 B1 * | 12/2002 | Chu et al. ................. 707/104.1 |

* cited by examiner

SYSTEM AND METHODS FOR INHERITING INFORMATION INTO A DATASET

RELATED APPLICATIONS

This application claims the benefit of U.S. Provisional Application No. 60/167,398, filed Nov. 24, 1999. This application is also related to the following commonly-owned U.S. patent applications, the disclosures of which are hereby incorporated by reference in their entirety, including any appendices or attachments thereof, for all purposes:

Ser. No. 09/347,447, filed Jul. 3, 1999 and entitled SYSTEM AND METHODS FOR SYNCHRONIZING DATASETS USING COOPERATION AMONG MULTIPLE SYNCHRONIZATION ENGINES;

Ser. No. 09/311,781, filed May 13, 1999 and entitled SYSTEM AND METHODS FOR SYNCHRONIZING DATASETS IN A NON-FIFO OR OTHERWISE DIFFICULT COMMUNICATION ENVIRONMENT;

Ser. No. 09/208,815, filed Dec. 8, 1998 and entitled SYSTEM AND METHODS FOR ROBUST SYNCHRONIZATION OF DATASETS;

Ser. No. 09/136,215, filed Aug. 18, 1998 and entitled SYSTEM AND METHODS FOR SYNCHRONIZING TWO OR MORE DATASETS;

Ser. No. 09/136,212, filed Aug. 18, 1998 and entitled DATA PROCESSING ENVIRONMENT WITH METHODS PROVIDING CONTEMPORANEOUS SYNCHRONIZATION OF TWO OR MORE CLIENTS; and Ser. No. 08/923,612, filed Sep. 4, 1997 and entitled SYSTEM AND METHODS FOR SYNCHRONIZING INFORMATION AMONG DISPARATE DATASETS.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing. More particularly, the present invention relates to systems and methods for selectively "inheriting" event schedules or other information from information sources into target datasets in ways that enable flexible use of the target datasets.

Increasingly, people are discovering the power of computer-based personal information managers (PIMs) for managing appointments and other personal information such as tasks ("to-do's") and addresses. Individuals employ PIMs, for example, on personal computers (PCs), handheld electronic devices, and World Wide Web servers accessed via browsers. Examples of PC-based PIMs include the Sidekick® software application, which is available from Starfish® Software, Inc. ("Starfish"), the present assignee. Examples of handheld-device-based PIMs include the StarTAC® clipOn Organizer device and the REX PRO™ organizer device—both of which include licensed technology from Starfish—as well as the popular Palm™ family of organizer devices. Examples of "Web-based" PIMs include an online PIM provided by Starfish at a World Wide Web site of truesync.com. Starfish®, Sidekick®, and TrueSync® are registered trademarks of Starfish. StarTAC® is a registered trademark of Motorola, Inc. of Schaumburg, Ill. Starfish is a wholly-owned subsidiary of Motorola, Inc. REX™ and REX PRO™ are trademarks of Franklin Electronic Publishers of Burlington, N.J. Palm™ is a trademark of Palm, Inc. of Santa Clara, Calif.

The use of PIMs is ever expanding, and it has become common for an individual person to keep multiple "copies" of the same information on separate devices. For example, a user may keep his or her appointments in a dataset (i.e., collection of data) on a desktop PC at work, in a dataset on a notebook PC at home, and also in a dataset on a handheld device while in the field. Such a user is free to change the information in any one of these datasets independently of the other datasets. By doing so, the user typically spoils the equivalence between the datasets. Therefore, the user would typically synchronize these personal datasets occasionally to bring them back into equivalence. To perform such synchronization, the user generally uses a synchronization system, for example, one that is described in commonly-owned U.S. Pat. No. 5,519,606, which is hereby incorporated by reference.

Besides using PIMs and synchronization systems to manage personal information, users increasingly make use of information obtained from external information sources. Such information sources are found, for example, within the proliferation of World Wide Web sites, intranet sites, or the like (all called "websites" in this document) that offer online event schedules. Such event schedules are typically read-only information sources that are available to multiple users. Initially, each such website typically offered a limited number of event schedules. Later, mass-market websites, such as Internet "portal" websites, began to each provide large numbers of public event schedules including, for example, concert schedules, sporting-event schedules, and the like. In an effort to provide ever more services to their users, some websites that provide public event schedules also provide each individual user the ability to maintain an online personal calendar dataset for recording personal appointments. At such a website, a user is allowed to select public events or public event schedules for "tracking". Thereafter, when the user views a daily view of the user's own personal calendar, the website simultaneously displays public events for that day that the user has chosen for tracking. In this way, the website provides a rudimentary level of interaction between the user's online personal calendar provided on the website and the public event schedules provided on the website.

While adequate for the casual user, the above-described conventional calendar website is lacking in capability, especially for the modern user who has multiple calendars in multiple datasets. For example, a conventional calendar website makes no provision for machine-assisted synchronizing of the public events, as "tracked" within a user's personal online calendar on the website, with the user's other personal datasets such as datasets on PCs or on handheld devices.

Another problem with the conventional calendar website relates to a realization that a user may wish to modify public events that are tracked, for example, in a way such that the modifications are to exist only within the user's personal calendar. The conventional calendar website does not enable such modification and therefore causes user inconvenience.

What is needed are an improved system and improved techniques that can inherit information into a user's dataset and also provide additional capabilities for using the inherited information. More particularly, what is needed are such an improved system and improved techniques that provide the capability for user modification of inherited information and the capability for synchronization of inherited information with other datasets. Adding either of these capabilities would be useful, but adding both capabilities, and ensuring that they properly interact with one another, would be especially useful. What is further needed is for the improved system and techniques to be optimized for efficiency on a system on which many users, perhaps millions of users, are capable of each maintaining a dataset that can inherit information from one or more shared and public information sources. The preferred embodiment of the present invention fulfills these and other needs.

SUMMARY OF THE INVENTION

One embodiment of the present invention comprises a method of inheriting data from a second dataset into a first dataset. The method comprises the steps of receiving a first user input, the first user input selecting a first data item from the second dataset for inheritance into the first dataset; placing a first pointer in the first dataset, pointing to a first record in the second dataset that contains the first data item; and, when processing data in the first dataset, using the first pointer to locate the first record in the second dataset, and including the first data item from the second dataset in the processing of data in the first dataset. If the processing of data in the first dataset is responsive to a user's selection of data items for display, then the method may further comprise the steps of receiving a second user input, the second user input indicating selected data items to be displayed; establishing a filter for identifying the selected data items to be displayed; applying the filter to the first dataset; applying the filter to the first data item, using the first pointer to locate the first data item; and displaying data from the first dataset and from the first data item that satisfy the filter requirements. This method may also comprise the steps of receiving a third user input, the third user input indicating changes to be made to the first data item; creating a local copy of the first data item in the first dataset; and applying the user changes to the local copy of the first data item. In this case, the first pointer, pointing to the first record in the second dataset, may be retained. Also, when processing data in the first dataset, the local copy of the first data item may be included in the processing of data in the first dataset. The method may also comprise the steps of receiving a fourth user input, the fourth user input selecting a third dataset and indicating that the entire third dataset is to be inherited into the first dataset; placing a second pointer in the first dataset, pointing to the third dataset; and, when processing data in the first dataset, using the second pointer to locate the third dataset, and including the data in the third dataset in the processing of data in the first dataset. The method may also comprise the steps of receiving a fifth user input, the fifth user input selecting a second data item from the second dataset for inheritance into the first dataset, wherein the second data item has been inherited from a fourth dataset into the second dataset, the second dataset including a fourth pointer to a second record in the fourth dataset that contains the second data item; placing a third pointer in the first dataset, pointing to the fourth pointer in the second dataset; and, when processing data in the first dataset, using the third pointer to locate the fourth pointer, using the fourth pointer to locate the second data item, and including the second data item from the fourth dataset in the processing of data in the first dataset. The method may also comprise the steps of receiving a sixth user input, the sixth user input selecting the fourth dataset and indicating that the entire fourth dataset is to be inherited into the first dataset; placing a fifth pointer in the first dataset, pointing to the fourth dataset; and, when processing data in the first dataset, using the fifth pointer to locate the fourth dataset, and including the data in the fourth dataset in the processing of data in the first dataset, but also detecting that the second data item has been inherited into the first dataset both through the second dataset and directly from the fourth dataset, and avoiding processing the second data item a second time. The method may also comprise a step of synchronizing the first dataset with an alter-ego dataset, including the first data item from the second dataset in the synchronization, so that after the synchronization the alter-ego dataset has a copy of the first data item from the second dataset. In this case, a local copy of the first data item may be stored in the first dataset prior to the synchronization with the alter-ego dataset. The method may also comprise the steps of receiving an update to the first data item from the alter-ego dataset during the synchronization; and entering the update from the alter-ego dataset into the local copy of the first data item. The method may also comprise the steps of receiving a seventh user input, the seventh user input indicating a change to be made to the first data item; applying the user change to the local copy of the first data item; receiving an update to the first data item from the alter-ego dataset during the synchronization; resolving conflicts between the update to the first data item from the alter-ego dataset and the user change received in the seventh user input; and entering the update from the alter-ego dataset into the local copy of the first data item and propagating the user change from the seventh user input to the alter-ego dataset as appropriate, based on the conflict resolution. The method may also comprise the steps of synchronizing the local copy of the first data item in the first dataset with the first data item in the second dataset simultaneously with the synchronization between the first dataset and the alter-ego dataset; receiving an update to the first data item from the second dataset; receiving an update to the first data item from the alter-ego dataset; resolving conflicts between the updates to the first data item from the second dataset and the alter-ego dataset; and entering the updates into the first dataset and propagating the updates to the second dataset and the alter-ego dataset as appropriate, based on the conflict resolution.

The present invention also comprises a method of processing data in a first dataset, the data in the first dataset including data that is native to the first dataset, data that is inherited on a record level from a second dataset, data that is inherited on a record level from the second dataset that is further inherited on a record level from a third dataset, data that is inherited on a dataset level from the third dataset, and data that is inherited from the second dataset and that is modified locally. This method comprises the steps of processing the data in the first dataset that are native to the first dataset; processing the data in the first dataset that are inherited from the second dataset and for which a local copy has not already been processed; and processing the data in the first dataset that are inherited from the third dataset and that have not already been processed during the processing of data that are inherited from the second dataset. In this method, the data in the first dataset may also include data that is inherited from the third dataset and that is modified locally. In this case, the step of processing the data in the first dataset that are inherited from the third dataset excludes data for which a local copy has already been processed. Also, the processing of data in the first dataset may include displaying a portion of the data from the first dataset.

The present invention also comprises a system for inheriting data into a first dataset from a plurality of other datasets. This system comprises a plurality of native data in the first dataset; a first pointer in the first dataset, the first pointer pointing to a first data item in a second dataset to inherit the first data item from the second dataset into the first dataset on a record level; a second pointer in the first dataset, the second pointer pointing to a third pointer in a third dataset, the third pointer pointing to a second data item in a fourth dataset to inherit the second data item from the third dataset into the first dataset on a record level, the second data item further being inherited from the fourth dataset into the third dataset on a record level; and a fourth pointer in the first dataset, the fourth pointer pointing to a fifth dataset to inherit the fifth dataset into the first dataset on a dataset level, wherein, when the system processes data in the first dataset, the system processes data that is native to the first dataset, along with the first data item, the second data item, and data from the fifth dataset. In this system, the second dataset and the third dataset may be the same dataset, or the second dataset and the fifth dataset may be the same dataset. Also, if a user of the first dataset attempts to modify the first data item, the system may create a local copy of the first data item in the first dataset and modify the local copy, instead of the first data item in the second dataset. Also, when the system processes data in the first dataset, the system may detect a duplicated inheritance of a data item and avoid processing the data item multiple times. Finally, the system may comprise a synchronizer and an alter-ego dataset, the synchronizer may synchronize the first dataset with the alter-ego dataset, including the data that is native to the first dataset, the first data item, the second data item, and data from the fifth dataset.

The present invention also comprises a method of inheriting data into a first dataset from one or more ancestor datasets and of synchronizing data between the first dataset and one or more alter-ego datasets. This method comprises the steps of receiving a first user input, the first user input selecting a first data item from a first ancestor dataset for inheritance into the first dataset; and performing a first synchronization of at least a portion of the first dataset with at least a portion of a first alter-ego dataset, including sending a copy of the first data item to the first alter-ego dataset for inclusion in the first alter-ego dataset as a first alter-ego copy of the first data item. The method may also comprise the steps of receiving at the first alter-ego dataset a first user change to the alter-ego copy of the first data item; performing a second synchronization between the first dataset and the first alter-ego dataset, including receiving at the first dataset the first user change to the first data item; making a local copy of the first data item in the first dataset; and entering the first user change into the local copy of the first data item at the first dataset. The step of making the local copy of the first data item in the first dataset may occur before the first synchronization between the first dataset and the first alter-ego dataset. The method may also comprise the steps of receiving at the first alter-ego dataset a second user change to the alter-ego copy of the first data item; beginning a third synchronization between the first dataset and the first alter-ego dataset; receiving at the first dataset the second user change to the first data item; detecting a third change to the first data item in the first ancestor dataset; making a local copy of the first data item in the first dataset; performing a conflict resolution between the second user change to the first data item and the third change to the first data item; and completing the third synchronization by entering the second user change into the local copy of the first data item, entering the third change into the local copy of the first data item, and propagating the third change to the first alter-ego dataset, as appropriate, based on the conflict resolution. The method may also comprise the steps of receiving at the first dataset a fourth user change to the first data item; making a local copy of the first data item in the first dataset; entering the fourth user change to the first data item into the local copy of the first data item; receiving at the first alter-ego dataset a fifth user change to the alter-ego copy of the first data item; beginning a fourth synchronization between the first dataset and the first alter-ego dataset; receiving at the first dataset the fifth user change to the first data item; performing a conflict resolution between the fourth user change to the first data item and the fifth user change to the first data item; and completing the fourth synchronization by entering the fifth user change into the local copy of the first data item, and propagating the fourth user change to the first alter-ego dataset, as appropriate, based on the conflict resolution. This method may also comprise the step of placing a first pointer in the first dataset, pointing to the first data item in the first ancestor dataset. Finally, the method may comprise the step of displaying a portion of the first dataset to a user, including the first data item.

DETAILED DESCRIPTION OF A PREFERRED EMBODIMENT

The following description will focus on the currently-preferred embodiment of the present invention, which is operative in an environment typically including desktop computers, server computers, and portable computing devices, occasionally or permanently connected to one another. The currently-preferred embodiment of the present invention may be implemented in an application operating in an Internet-connected environment and running under an operating system, such as the Microsoft® Windows operating system, on an IBM-compatible personal computer configured as an Internet server. The currently-preferred embodiment is particularly suited for inheriting event-type information from public information sources into private datasets. The present invention, however, is not limited to any particular environment, device, or application. Instead, those skilled in the art will find that the present invention may be advantageously applied to any environment or application in which synchronization is desired for multiple datasets, and information is wished to be inherited from an information source or repository. For example, the present invention may be advantageously embodied on a variety of different platforms, including Macintosh, Linux, EPOC, BeOS, Solaris, UNIX, NextStep, and the like. The description of the exemplary embodiments which follows is, therefore, for the purpose of illustration and not limitation.

The following description includes section titles that should help the reader. The section titles, which are kept short for readability, of course are not intended to, and cannot be expected to, fully summarize the contents of particular sections. Therefore, the section titles should not be improperly used for the purpose of limitation. The following description is separated into the following chapters:

I. Computer-based Implementation
II. System Overview
III. Methodology Overview
IV. Methodology for Using Information In A Child Dataset
V. Methodology for Directly Modifying Inherited Information In Child Dataset
VI. Introduction to Synchronizing a Child Dataset with its Alter-ego Dataset(s)
VII. Method to Synchronize, with Inheritance-awareness, Child and Alter-ego Datasets
VIII. Method to Update (Synchronize) a Child Dataset with Changes of a Parent Dataset
IX. Miscellaneous Supplemental Discussion (Detailed)

I. Computer-Based Implementation

A. Basic System Hardware (e.g., for Server or Desktop Computers)

Figure 1:
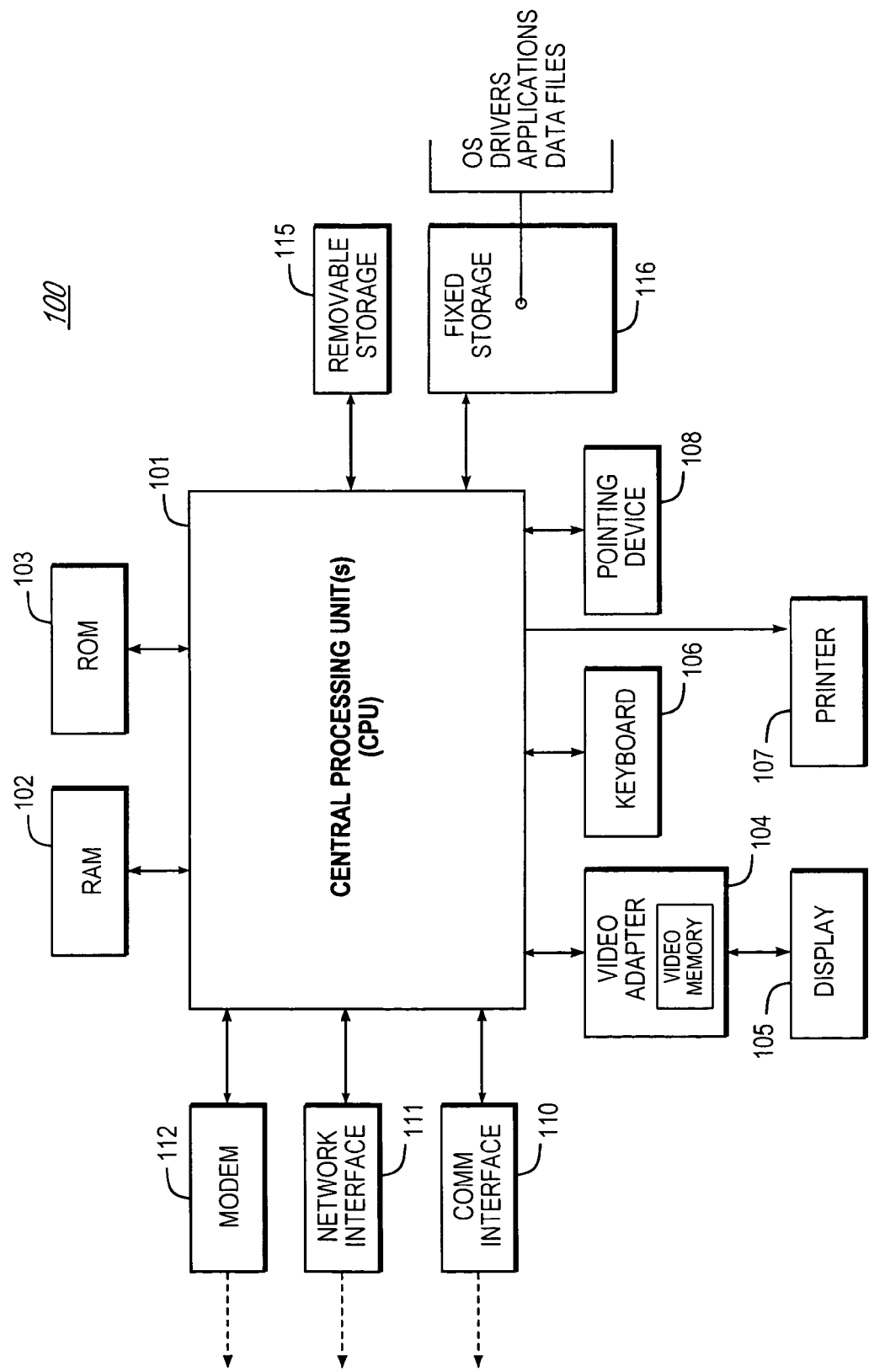
FIG. 1 is a block diagram that depicts a conventional or general-purpose computer system, such as an IBM-compatible personal computer (PC) or server computer or other similar platform, that may be used for implementing the present invention.

The present invention may be implemented on a conventional or general-purpose computer system, such as an IBM-compatible personal computer or server computer. FIG. 1 is a general block diagram of an IBM-compatible system 100. As shown, system 100 comprises a central processing unit(s) (CPU) 101 coupled to a random-access memory (RAM) 102, a read-only memory (ROM) 103, a keyboard 106, a printer 107, a pointing device 108, a display or video adapter 104 connected to a display device 105 (e.g., a cathode-ray tube or a liquid-crystal display), a removable (mass) storage device 115 (e.g., floppy disk), a fixed (mass) storage device 116 (e.g., hard disk), a communication port(s) or interface(s) 110, a modem 112, and a network interface card (NIC) or controller 111 (e.g., Ethernet). Although not shown separately, a real-time system clock is included with the system 100, in a conventional manner.

CPU 101 preferably comprises a processor of the Intel Pentium® family of microprocessors. However, any other suitable microprocessor or microcomputer may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between, and among, the various components. Descriptions of Pentium-class microprocessors and their instruction set, bus architecture, and control lines are available from Intel Corporation of Santa Clara, Calif. Random-access memory 102 serves as the working memory for the CPU 101. In a typical configuration, a RAM of sixteen megabytes or more is employed. More or less memory may be used without departing from the scope of the present invention. The read-only memory (ROM) 103 contains the basic input/output system code (BIOS)—a set of low-level routines in the ROM 103 that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network or it may be a dedicated mass storage. As shown in FIG. 1, fixed storage 116 stores a body of programs and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the storage device or fixed storage 116 into the main (RAM) memory 102, for execution by the CPU 101. During operation of the program logic, the system 100 accepts, as necessary, user input from a keyboard 106 and pointing device 108, as well as speech-based input from a voice recognition system (not shown). The keyboard 106 permits selection of application programs, entry of keyboard-based input or data, and selection and manipulation of individual data objects displayed on the display device 105. Likewise, the pointing device 108, such as a mouse, track ball, pen device, or the like, permits selection and manipulation of objects on the display device 105. In this manner, these input devices support manual user input for any process running on the system.

The computer system 100 displays text and/or graphic images and other data on the display device 105. The display device 105 is driven by the video adapter 104, which is interposed between the display device 105 and the system 100. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet® printer (available from Hewlett-Packard of Palo Alto, Calif.), for creating hard copy images of output of the system.

The system itself communicates with other devices (e.g., other computers) via the network interface card (NIC) 111 connected to a network (e.g., Ethernet network), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication ("comm") interface 110, which may include a RS-232 serial port, a Universal Serial Bus (USB) interface, or the like. Devices that will be commonly-connected locally to the comm interface 110 include laptop computers, handheld organizers, digital cameras, and the like.

The above-described system 100 is presented for purposes of illustrating the basic hardware underlying desktop (client) and server computer components that may be employed in the system of the present invention. For purposes of discussion, the following description will present examples in which it will be assumed that there exists a client machine (e.g., desktop "PC") having application software locally that, in turn, is connected to a "server" or remote device having information of interest to the ultimate end-user. The present invention, however, is not limited to any particular environment or device configuration. In particular, a client/server distinction is neither necessary to the invention nor even necessarily desirable, but is used to provide a framework for discussion. Instead, the present invention may be implemented in any type of computer system or processing environment capable of supporting the methodologies of the present invention presented in detail below.

B. Basic System Software

Figure 2:
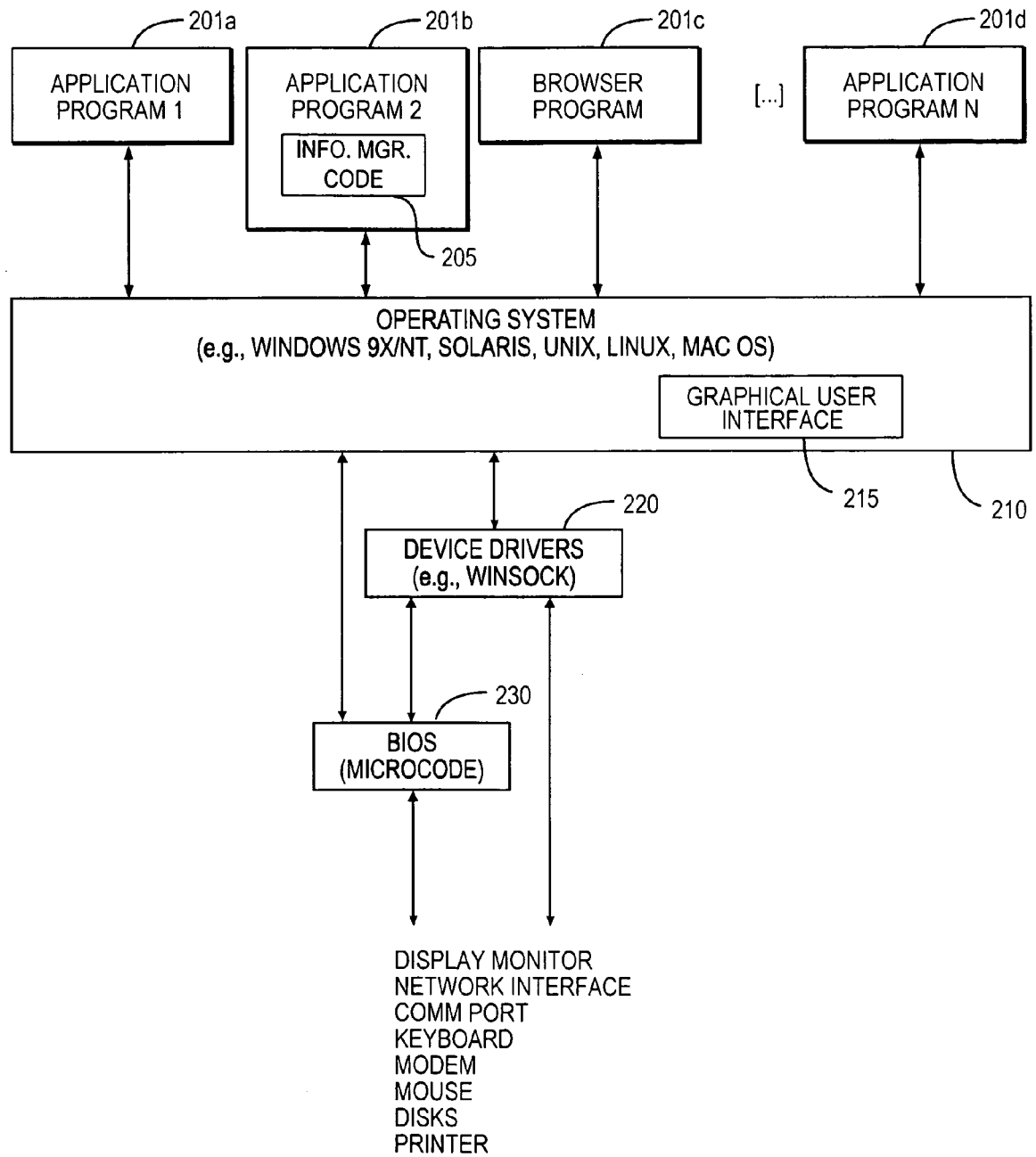
FIG. 2 is a block diagram that depicts a software system for controlling the computer system of FIG. 1.

As illustrated in FIG. 2, a computer software system 200 is provided for directing the operation of the computer system 100. The software system 200, which is stored on the fixed storage (e.g., hard disk) 116 and loaded into the RAM 102, as needed, includes a kernel or operating system (OS) 210. The OS 210 manages low-level aspects of computer operation, including managing execution of processes, memory allocation, file input/output (I/O), and device I/O. One or more application programs, such as client application software or "programs" 201 (e.g., 201a, 201b, 201c, and 201d) may be "loaded" (i.e., transferred from fixed storage 116 into RAM 102) for execution by the system 100.

The software system 200 includes a graphical user interface (GUI) 215, for receiving user commands and data in a graphical (e.g., "point-and-click") fashion. These inputs, in turn, may be acted upon by the system 100 in accordance with instructions from the operating system 210 and/or client application programs 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver) and the system BIOS microcode 230 (i.e., ROM-based microcode), particularly when interfacing with peripheral devices. OS 210 can be provided by a conventional operating system, such as Microsoft® Windows 95, Windows 98, Windows NT, Windows 2000, or Windows ME, all of which are available from Microsoft Corporation of Redmond, Wash. Alternatively, OS 210 can also be an alternative operating system, such as IBM OS/2 (available from IBM of Armonk, N.Y.) or Macintosh OS (available from Apple Computers of Cupertino, Calif.).

Of particular interest, at least one of the application programs 201 of the software system 200 is modified to include program code 205 for controlling an information manager of the present invention that provides inheritance and synchronization services. Construction and operation of the information manager of the present invention, including supporting methodologies, will now be described in further detail.

II. System Overview

A. Parent, Child (e.g., GUD), and "Alter-Ego" (e.g., Client) Datasets

Figure 3A:
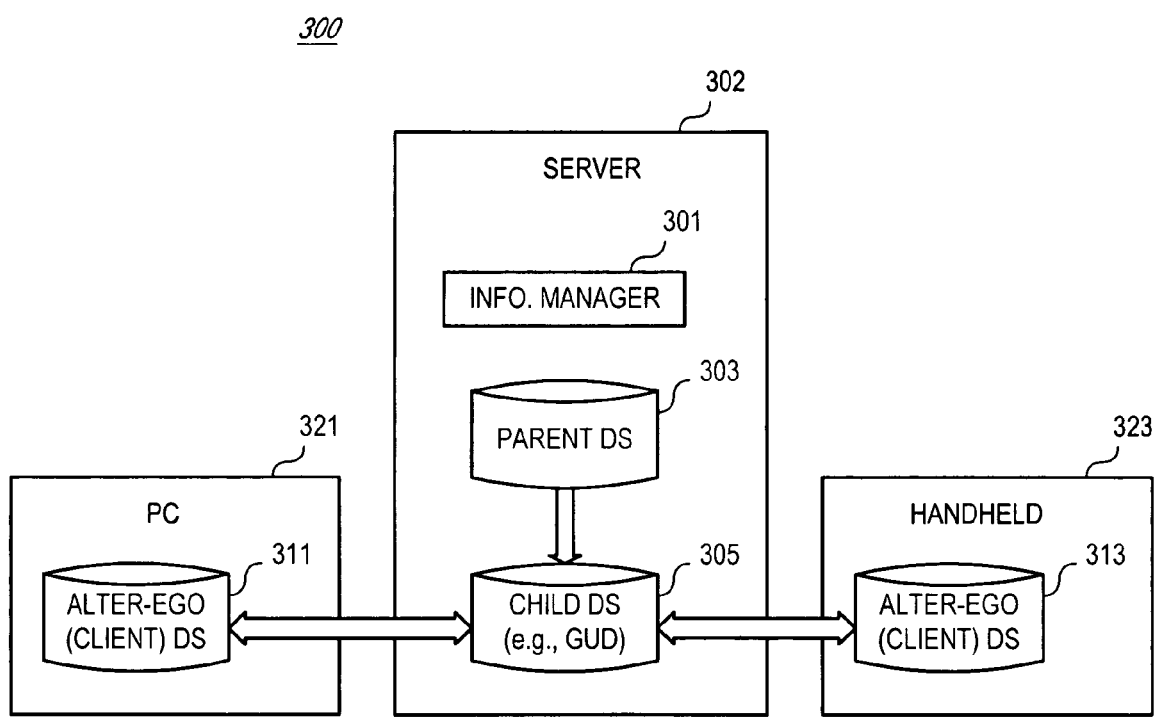
FIG. 3A is a block diagram that depicts an information management system, and its environment, according to the present invention for handling information inheritance.

FIG. 3A is a block diagram 300 that depicts an information management system 301 ("Infomanager") and its environment. The Infomanager 301 preferably runs on a server computer 302 that can be accessed from the Internet, an intranet, any (other) public, private, or global communication network, or the like. The Infomanager 301 maintains and controls a number of datasets including, for example, a parent dataset 303 and a child dataset 305. The child dataset 305 can inherit information from the parent dataset 303. The concept of inheritance, as it relates to the present invention, will be further described in a later section. In general, information may flow from the parent dataset 303 into the child dataset 305 via inheritance, but the child dataset 305 needs not alter the parent dataset 303. This generally or largely one-way flow of information, controlled by the Infomanager 301, is shown schematically in FIG. 3A by a unidirectional solid arrow (e.g., "flow arrow") that couples the parent dataset 303 and the child dataset 305. The child dataset 305 preferably has arbitrarily many "copies", or "alter-ego" datasets, including, for example, alter-ego datasets 311 and 313. The alter-ego datasets 311 and 313 may reside, for example, on a PC 321 and a handheld device 323, respectively. In general, the child dataset 305 and its alter-ego datasets 311 and 313 may be independently modified by a user to spoil their equivalence, and thereafter be brought back into equivalence by synchronization. To this end, the Infomanager 301's control logic preferably includes synchronization-engine logic, not pictured in FIG. 3A, that controls synchronization according to the methods of the present invention. In general, information may flow to, or from, the child dataset 305 and its alter-ego datasets 311 and 313 during synchronization, under control of the Infomanager 301, as is shown schematically in FIG. 3A by the bi-directional solid flow arrows that couple these datasets to one another.

The Infomanager 301 is preferably universally accessible over a global network via any browser, such as Internet Explorer, available from Microsoft Corporation, or a Wireless Application Protocol (WAP) browser, available on portable wireless devices, such as cellular phones available from Motorola, Inc. (e.g., the Motorola v3688 phone). The parent (e.g., public) dataset 303 may include, for example, event schedules, contact lists (e.g., customer lists), inventory lists (e.g., price lists), and the like. In general, most users will not have the authority to modify the parent dataset 303 itself, as it would be seen by other unrelated users. The child (e.g., personal) dataset 305 is typically a dataset that is available to fewer users (e.g., one person) than is the parent dataset 303. (The Wireless Application Protocol (WAP) mentioned above is a global communications protocol standard that is designed for use over wireless networks, such as CDPD, CDMA, GSM, PDC, PHS, TDMA, FLEX, ReFLEX, iDEN, TETRA, DECT, DataTAC, Mobitex, and the like. WAP is further described within the WAP Specifications, e.g., version 1.1, currently available via the Internet at the World Wide Web site of wapforum.org.)

The Infomanager 301 of FIG. 3A and its datasets may be constructed from Starfish synchronization system(s), that are described, for example, in the incorporated, commonly-owned U.S. patent applications having Ser. No. 09/347,447 (filed Jul. 3, 1999), Ser. No. 09/311,781 (filed May 13, 1999), Ser. No. 09/208,815 (filed Dec. 8, 1998), or Ser. No. 09/136,215 (filed Aug. 18, 1998) by adding the additional features and synchronization methods described in the present document. The Starfish synchronization system(s) that are described in the incorporated U.S. patent applications typically include a reference dataset, or "GUD" (Grand Unified Dataset), and synchronization "clients". In the present document, a child dataset, such as dataset 305, acts as the GUD for a user's datasets that need to be synchronized with the child dataset. Further, the child dataset's alter-ego datasets, such as datasets 311 and 313, are the child dataset's synchronization clients.

B. Types and Aspects of Inheritance

1. Introduction:

For the present invention, inheritance refers to the obtaining of information of a first dataset for use with a second dataset. The obtained information is expected to be used similarly, at least in some respect, to information of the second dataset that was not obtained from the first dataset. For example, in the preferred embodiment of the present invention, a child dataset will inherit records (e.g., calendar events) of a parent dataset and thereafter present the inherited records to the user along with the child dataset's own records that are not inherited from any other dataset, in response to a user request to view records for the child dataset (e.g., a request to view calendar-event records within a user-specified date range).

2. An Example Configuration of Datasets

Figure 3B:
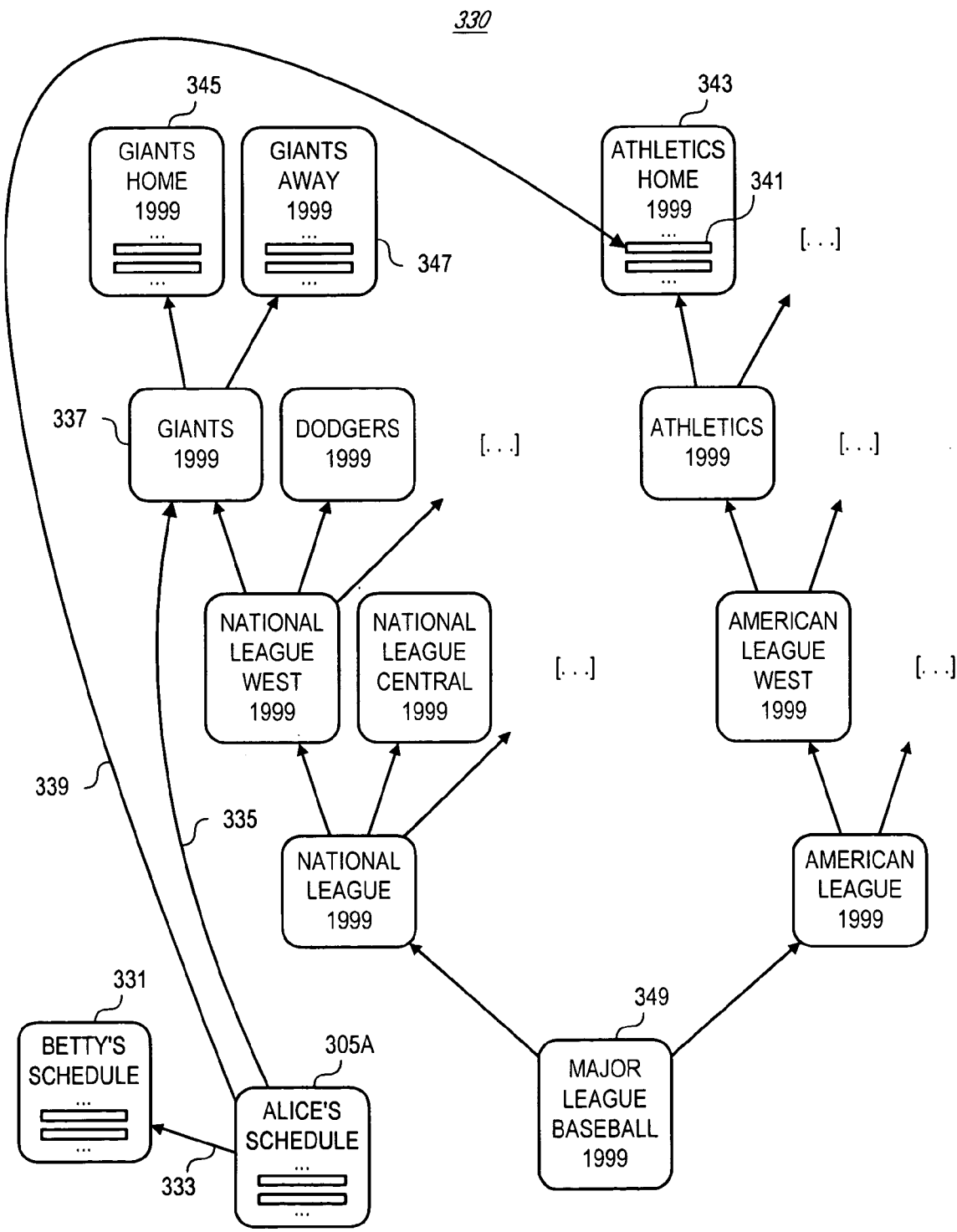
FIG. 3B is a block diagram that depicts various example inheritance relationships established among multiple datasets using the information manager of the present invention.

In the present invention, the Infomanager 301 enables and supports various types of inheritance among multiple datasets. Perhaps the quickest way to introduce these types of inheritance is with an example. FIG. 3B is a block diagram that depicts various example inheritance relationships 330 established among multiple datasets using the Infomanager 301. In the example of FIG. 3B, a user, Alice, has designated her personal calendar dataset 305A to inherit her daughter, Betty's, entire personal calendar dataset 331. This inheritance of an entire dataset is shown in FIG. 3B by an inheritance pointer 333 from the child dataset (305A) to the entire parent dataset (331). (As a matter of notation, please observe that the direction of inheritance pointers in FIG. 3B is from child to parent, whereas the direction of "information-flow pointers" in FIG. 3A was from parent to child.) Alice has similarly designated her personal calendar dataset 305A to inherit a dataset 337, as shown in FIG. 3B by an inheritance pointer 335. The dataset 337 is preferably a public dataset that is accessible by the entire world. The dataset 337 includes the San Francisco Giants baseball team's entire baseball season schedule. Alice has further designated her personal calendar dataset 305A to inherit a particular data record 341 in a dataset 343, as shown by an inheritance pointer 339. The particular data record 341 corresponds to a single baseball game involving the Oakland Athletics baseball team. The dataset 343 contains the Oakland Athletics baseball team's entire home season schedule. Alice has not designated her personal calendar dataset 305A to inherit any data record of the dataset 343 other than the data record 341.

As shown in FIG. 3B, the dataset 337, which contains the Giant's team schedule, itself inherits (and is in fact entirely made up of) two inherited datasets 345 and 347. The two inherited datasets 345 and 347 contain the Giants' entire season schedule for home games and the Giants' entire season schedule for away games, respectively. The dataset 337, which contains the Giant's team schedule, is also inherited by a division-schedule dataset, which is in turn inherited by a league-schedule dataset, which is in turn inherited by a dataset 349 that includes, via inheritance, all games from all U.S. major league baseball teams. (The dataset 349 which includes all games of all teams seemingly inherits two data records for each game—i.e., a record from a team's home schedule and a record from the opposing team's away schedule. This needs not be a problem, as will be further described.)

In general, the user designates an entire dataset for inheritance by selecting the parent dataset from a user interface and invoking an "inherit-this-dataset" command. Similarly, the user designates an individual record for inheritance by selecting the record from a user interface and invoking an "inherit-this-record" command. For example, the user may navigate a tree or other listing structure provided by the Infomanager's user interface, click on a dataset's or record's visual identifier using a mouse button (e.g., a rightmost button), and then click (e.g., using a leftmost button) an "inherit-this-dataset" or "inherit-this-record" command on a pop-up command menu that the Infomanager 301 has displayed in response to the first click. The Infomanager 301 may also use any other similar user-interface techniques for allowing the user to establish inheritance relationships.

3. Dataset-Level and Record-Level Inheritance

It is helpful to examine various aspects of inheritance in the present invention, as exemplified in FIG. 3B. According to an aspect of inheritance in the present invention, the Infomanager permits a dataset to inherit entire other dataset(s). This type of inheritance may be termed dataset-level inheritance. Dataset-level inheritance is shown in FIG. 3B by the inheritance pointers 333 and 335. According to another aspect of inheritance in the present invention, the Infomanager permits a dataset to inherit less than an entire other dataset. In particular, the Infomanager permits a dataset to inherit individual records (e.g., only one record) from within another dataset that might contain arbitrarily many records. This type of inheritance may be termed record-level inheritance. Record-level inheritance is shown in FIG. 3B by the inheritance pointer 339.

4. Chain or Multi-Generational Inheritance

According to still another aspect of inheritance in the present invention, the Infomanager supports chain inheritance or multi-generational inheritance, in which a dataset (the child dataset) that inherits another dataset (the parent dataset) on a dataset level automatically inherits not only the parent dataset's native records but also the parent dataset's own inherited records (i.e., records of grandparent datasets). As will be further described, the Infomanager also supports chain inheritance on a record level, such that a dataset can inherit a specific record from a parent dataset, even if the specific record of the parent dataset is a record inherited from a grandfather dataset on either a dataset level and/or a record level. In general, the Infomanager permits any configuration of inheritance relationships, so long as the resulting relationship map (e.g., "family tree") is acyclic. Put another way, preferably no dataset or record will be designated as its own ancestor via a chain of inheritance relationships. Preferably, the Infomanager includes loop-detection logic that detects circular inheritance, or attempted circular inheritance, and generates an error message to the user.

5. Preferred Terminology

It is helpful to further explain the preferred terminology for describing parent/child relationships. If a first dataset is inheriting a second dataset on a dataset level, and/or the first dataset is inheriting a particular record(s) of the second dataset on a record level, then the first and second datasets may be termed the child and parent datasets, respectively. Each record in a parent dataset that is being inherited on a dataset level by a child dataset is considered to be a parent record. Each record that is being inherited on a record level by a child dataset is considered to be a parent record. A child dataset is said to include, or have within, an inherited record, or child record, to correspond to each and every parent record. This child record is a conceptual construct useful for describing inheritance relationships. Saying that the child dataset includes the child record does not imply that any particular dataset structure, or any particular data, is actually used for implementing the inheritance relationship underlying the child record. Whenever use of the terms "parent dataset", "parent record", "child dataset", "child record", or "inherited record" need to be further refined with regard to the type(s) of inheritance involved (e.g., record level versus dataset level), then the context should provide further distinguishment, either explicitly or by implication or suggestion. Furthermore, if the present document should itself deviate from the above-described preferred terminology, then the context should provide the necessary meaning, either explicitly or by implication or suggestion.

6. Multiply-Inherited Records are Recognized and Handled

As was mentioned earlier, the dataset 349 of FIG. 3B, which contains the entire Major League Baseball schedule, seemingly inherits two records for every game, e.g., a record from a team's home schedule and a record from the opposing team's away schedule. This needs not be a problem within the present invention because the two records preferably are in fact the same record, with one record being merely a record-level inheritance of the other record. For example, although not shown in FIG. 3B, all "away schedule" datasets preferably merely inherit individual records from other teams' "home schedule" datasets, rather than include duplicate records. In this preferred arrangement, given that there is only one non-inherited record per game, the Infomanager can employ preferred logic, which will be further described, for suppressing already-seen records when retrieving records for viewing or for other use.

III. Methodology Overview

A. The Overall Methodology

1. Inherit Parent Records on Record or Dataset Level

Figure 4A:
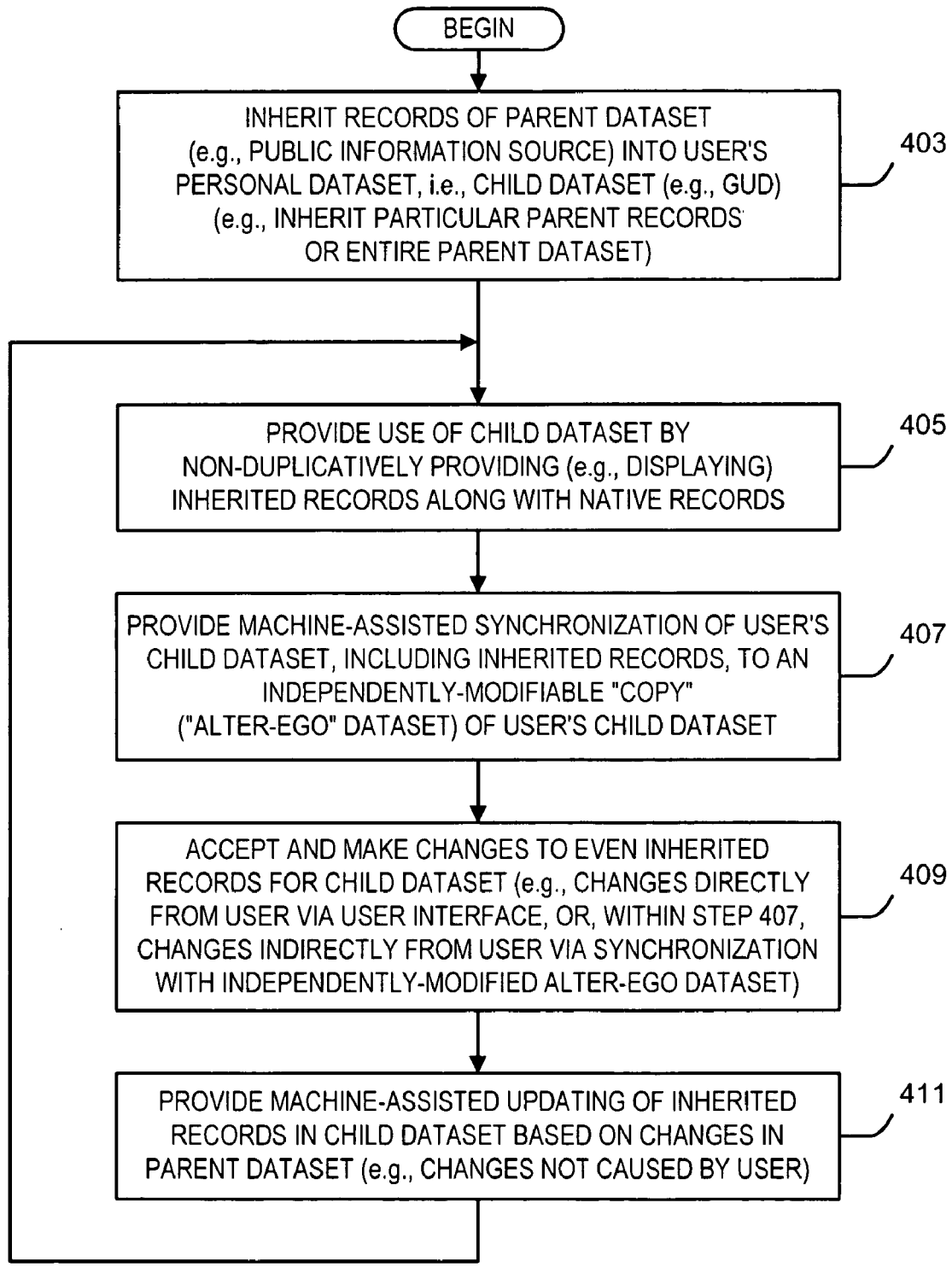
FIG. 4A is a flowchart that describes an overall methodology for handling inheritance of information in the present invention.

FIG. 4A is a flowchart that describes an overall method 400 for handling inheritance of information in the present invention. As shown, in a step 403, the Infomanager of the present invention establishes inheritance relationships between datasets and records, e.g., according to user designation. In particular, the Infomanager structures a user's personal dataset to inherit record(s) from parent dataset(s), preferably on either a record level and/or on a dataset level. For the user's personal dataset, the Infomanager can further take some or all of steps 405, 407, 409, and/or 411, in any order, once or repeatedly.

2. Provide Inherited Records Along with Native Records

In the step 405, the Infomanager provides use of the user's personal dataset, which will be called the child dataset. In particular, the Infomanager displays, or otherwise provides, inherited records along with the child dataset's native records to the user and/or to other requesting entities. As has been, and as will be, further described, in providing inherited records, the Infomanager suppresses duplicatively-providing records—e.g., prevents doubly-inherited records from being provided twice.

3. Synchronize Child Dataset, including Inherited Records, with Alter-Egos

In the step 407, the Infomanager performs machine-assisted synchronization, e.g., fully automatic synchronization, of the child dataset with other dataset(s). These other datasets are typically the child dataset's alter-ego dataset(s) which may need to be brought (back) into equivalence with the child dataset after possible independent modification by, e.g., the user. Importantly, the inherited records in the child dataset participate in the synchronization, such that the inherited records in the child dataset are made available, as copies, on the alter-ego datasets after the synchronization. Thus, even if the alter-ego datasets become no longer coupled to the child dataset and not coupled to the child dataset's parent datasets after the synchronization, the copies of the inherited records are available for use in the alter-ego datasets.

4. Allow Local Changes to be Made to Inherited Records

In the step 409, the Infomanager accepts and makes a change to a record belonging to the child dataset. The record to be changed (e.g., updated or deleted) may be, for example, an inherited record or child record, belonging to the child dataset. The changed child record is thereafter seen in its changed form as accessed from the child dataset. In general, the parent record of the child record is not itself thereby changed as accessed by other users or as accessed from within other datasets. The change may come from the user, for example, directly via a user interface provided by the Infomanager. The change may also come from synchronization of the child dataset with an alter-ego dataset, in which event the execution of the step 409 might be considered a substep within an execution of the step 407. (More particularly, if the change comes from synchronization of the child dataset with an alter-ego dataset, the circumstance underlying the change might be, for example, that the alter-ego's copy of the child record has been changed, and the synchronization logic, which will be further described, determines to propagate the change to the child record.)

5. Update (Synchronize) Child Dataset with Changes of Parent Dataset

In the step 411, the Infomanager provides machine-assisted updating of the child dataset, if necessary, based on any changes that may have occurred in the child dataset's parent dataset(s). For example, if the child dataset includes locally-modified child records (e.g., inherited records modified by an execution of the step 409), and any parent record of the child records has changed, e.g., since the local modification, then the Infomanager automatically initiates conflict resolution to reconcile the locally-modified child record with the changed parent record. The steps 405, 407, 409, and 411 will be further described in the remainder of this document.

B. Preferred Data Structures for Supporting the Overall Methodology

1. Dataset Pointers, Record Pointers, and Local Copies

In the present invention, a dataset capable of inheritance preferably can use data structures including dataset pointers, record pointers, and local record data. Dataset pointers point to, or identify, datasets inherited on a dataset level. Record pointers point to, or identify, individual parent records (whether inherited on a record level and/or a dataset level). Local record data is data for non-inherited, or native, records. Local record data may also be data for a user-modified inherited record, or child record. As will be further described, an inherited, but not-locally-modified inherited, record needs not have local data, but a locally-modified inherited record preferably does have associated local data. The local data associated with a locally-modified inherited record can be termed a local derivative copy of the parent record.

Of course, various inheritance status information is kept by the dataset. The Infomanager 301 keeps such status information either as dedicatedly-maintained or special-purpose flags or as the aggregate state of various data structures from which the status information can be deduced. This status information preferably includes (1) whether an inherited record is or is not being inherited on a record level, (2) whether the inherited record is or is not being inherited on a dataset level, (3) whether the inherited record has been locally modified, e.g., by the user directly or via synchronization, (4) the last time at which the inherited record was deemed "up-to-date" with respect to its parent record, (5) the last modification time of the inherited record, (6) the latest version of the parent record seen by the child dataset, and (7) the like. Note that the Infomanager defines the modification time (5) of an inherited record in the following way. For a locally-modified inherited record, the modification time is the time of the record's local modification. For an inherited record that is not locally modified (e.g., an inherited record that is purely a record pointer), the modification time is the later of the time that the record pointer came into existence and the most recent modification time of the inherited record's parent record of which the child dataset is aware. The modification time of the parent record is defined in the same manner. Note also that the Infomanager 301 may keep the latest-seen version of the parent record (6) in a data field that is propagated during synchronization, as will be further discussed.

2. An Example Configuration of the Preferred Data Structures

Figure 4B:
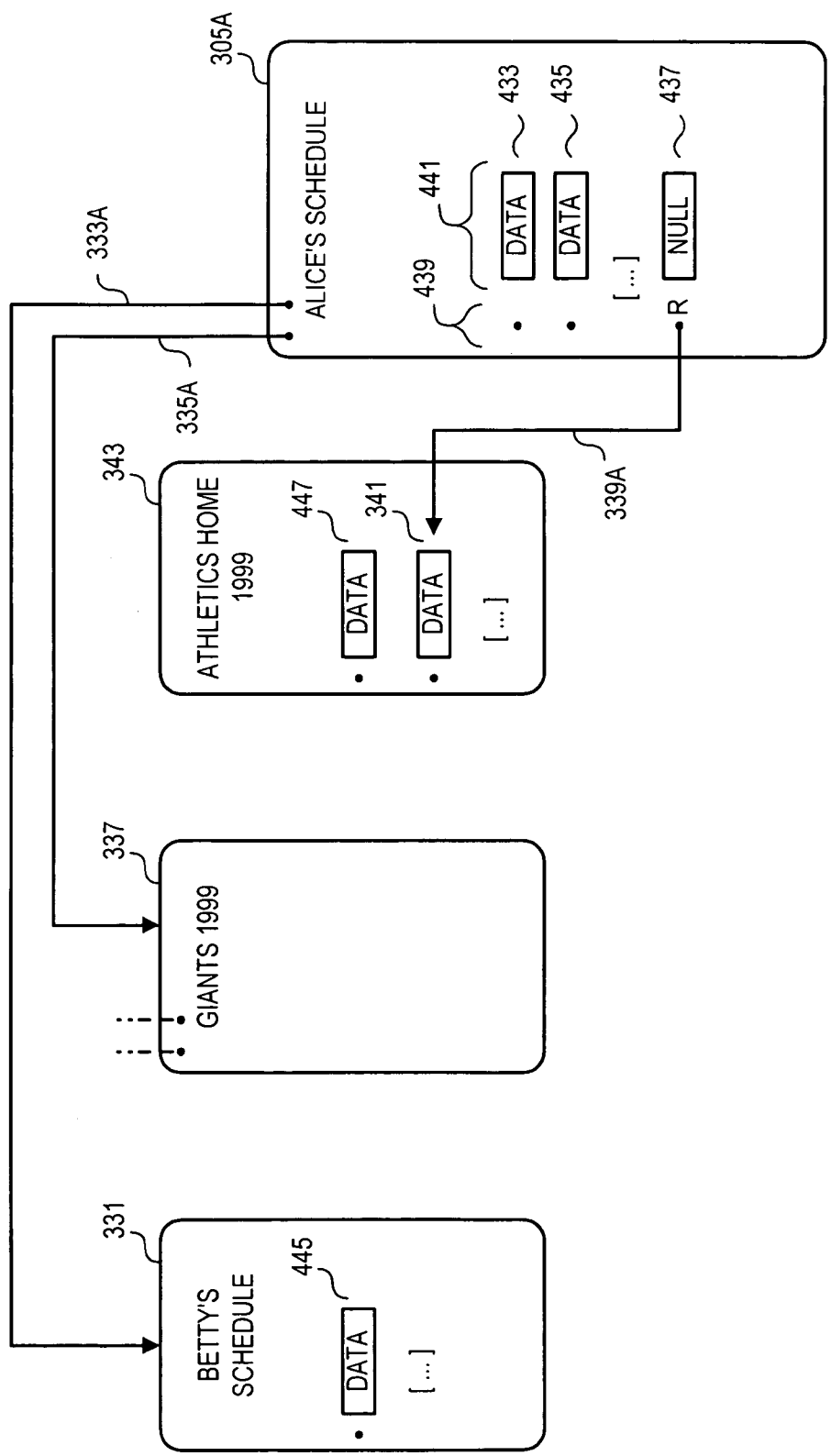
FIG. 4B is a block diagram that depicts a preferred exemplary set of data structures that are suitable for providing the inheritance methodologies of the present invention.

FIG. 4B is a block diagram that depicts certain preferred data structures 430 that are suitable for use in providing the inheritance methodologies of the present invention. FIG. 4B is based on the example datasets of FIG. 3B and includes elements that were shown in FIG. 3B. Such elements retain their numbering from FIG. 3B and need not be introduced in detail anew. As shown in FIG. 4B, Alice's dataset 305A inherits data records from three parent datasets: Betty's dataset 331, the Giants'-schedule dataset 337, and the Athletics'-home-schedule dataset 343. Alice's dataset 305A includes dataset pointers 333A and 335A that point to the parent datasets 331 and 337, respectively. Dataset pointers may be implemented, for example, as integer and/or text identifiers that are unique at least for each dataset within the group consisting of the Infomanager's inheritable datasets. Alice's dataset 305A includes a number of local entries that each corresponds to an individual data record. These local entries can be termed record-level entries. Examples of local record-level entries in FIG. 4B include record entries 433, 435, and 437. In general, each record-level entry includes, as components, a record pointer 439 and/or local data 441. In the preferred embodiment of the present invention, the following assumptions are guaranteed by the Infomanager. A native (i.e., non-inherited) record has a record-level entry that contains a null record pointer and contains, if the record is not yet deleted, local data. If a record of a dataset is an inherited record and has a record-level entry, then that record-level entry includes a pointer to the inherited record's parent record. A child record inherited on a record level will have a record-level entry and an indicator that the inheritance is on a record level. A child record inherited on a dataset level preferably needs not have a record-level entry, in general, but may have a record-level entry, e.g., for use in synchronization, as will be further discussed. Record-level entries include other status fields (modification times, and the like) that have been, and will be, further discussed.

The record-level entries 433 and 435 in FIG. 4B are each native, or non-inherited, data records of Alice's dataset 305A. As such, the record-level entries 433 and 435 have local data but no record pointers for pointing to parent records. The record-level entry 437 is an inherited record that inherits the record 341 of the Athletics'-home-schedule dataset 343 on a record level. As such, the record-level entry 437 includes a record pointer 339A to its parent record as well as an indicator, depicted as a letter "R" in FIG. 4B, that indicates a record-level-only inheritance. The inherited record 437 is shown in a state of having not been locally modified and (therefore) having no local data (NULL). Betty's dataset 331 is shown in FIG. 4B in an exemplary state of having at least a native record 445. The Giants'-schedule dataset 337 is shown in a state of having no native records and, indeed, no record-level entries at all. The Giants'-schedule dataset 337 does have dataset pointers to its parent datasets. These dataset pointers are only partially indicated in FIG. 4B by partial dashed lines. The Athletics'-home-schedule dataset 343 is shown in FIG. 4B as having at least the native record 341 and another exemplary native record 447.

A person of ordinary skill in the relevant art will easily see that the exemplary data structures of FIG. 4B can be implemented in a variety of ways, using almost any general or special-purpose programming language or platform. For example, the record pointers may be implemented as pointers (e.g., indices and/or addresses, or other identifiers) stored within a record-level data structure stored within a child dataset's contiguous local storage. For another example, some or all record pointers may be implemented as one of possibly many record identifier pairs within a centralized record inheritance table that is used, for example, for all child records in all of the Infomanager's datasets. Each such record-identifier pair links a child record in one dataset to the child record's parent record in another dataset by including the records' record identifiers. (Therefore, the record identifiers should be unique across all of the Infomanager's datasets. This uniqueness can be guaranteed, for example, by including a record's dataset's unique dataset identifier as a component.) Similarly, the dataset pointers may be implemented as pointers stored within a child dataset's storage, or implemented as a pair of dataset identifiers within a centralized dataset inheritance table that includes pairs of dataset identifiers that link child datasets to their parent datasets.

C. Methodology for Inheriting Information: Use Pointers and/or Local Copies

The methodology for establishing inheritance is straightforward. The Infomanager accepts a user designation of datasets and/or records to be inherited. In response, the Infomanager creates the corresponding data structure for the child dataset. For example, if a dataset is to be inherited on a dataset level, then a dataset pointer is created. If a specific record is to be inherited on a record level, then an appropriate record-level entry is created, such as the record-level entry 437 of FIG. 4B. In general, it is preferred that the least amount of redundancy be maintained in the child dataset. For example, it is preferred that, upon initial inheritance of a record on a record level, the Infomanager refrain from creating a local data copy of the inherited record without some indication that the user will locally-modify the inherited record. For another example, it is preferred that, upon initial inheritance of a parent dataset on a dataset level, the Infomanager refrain from creating local record-level entries, in the child dataset, for all of the parent dataset's records, unless there is some indication that the user will locally-modify a thus-inherited record in question or some indication that the user will synchronize the inheriting dataset with, e.g., alter-ego datasets. These preferences will be made more understandable by subsequent discussion of the present invention's methodologies. These preferences for minimal redundancy may be contradicted for particular implementations, depending on the constraints and preferences of the particular implementation and implementer. For example, if a particular implementation of the Infomanager is known to suffer from relatively large delays in accessing parent datasets (e.g., a possible delay of more than about eight times the average access time of local records), then it may become preferable to create local data copies of inherited records in a child dataset, even if no local modification is desired, merely to avoid delays from future accesses of the parent datasets.

IV. Methodology for Using Information in a Child Dataset

A. Overview

Figure 5A:
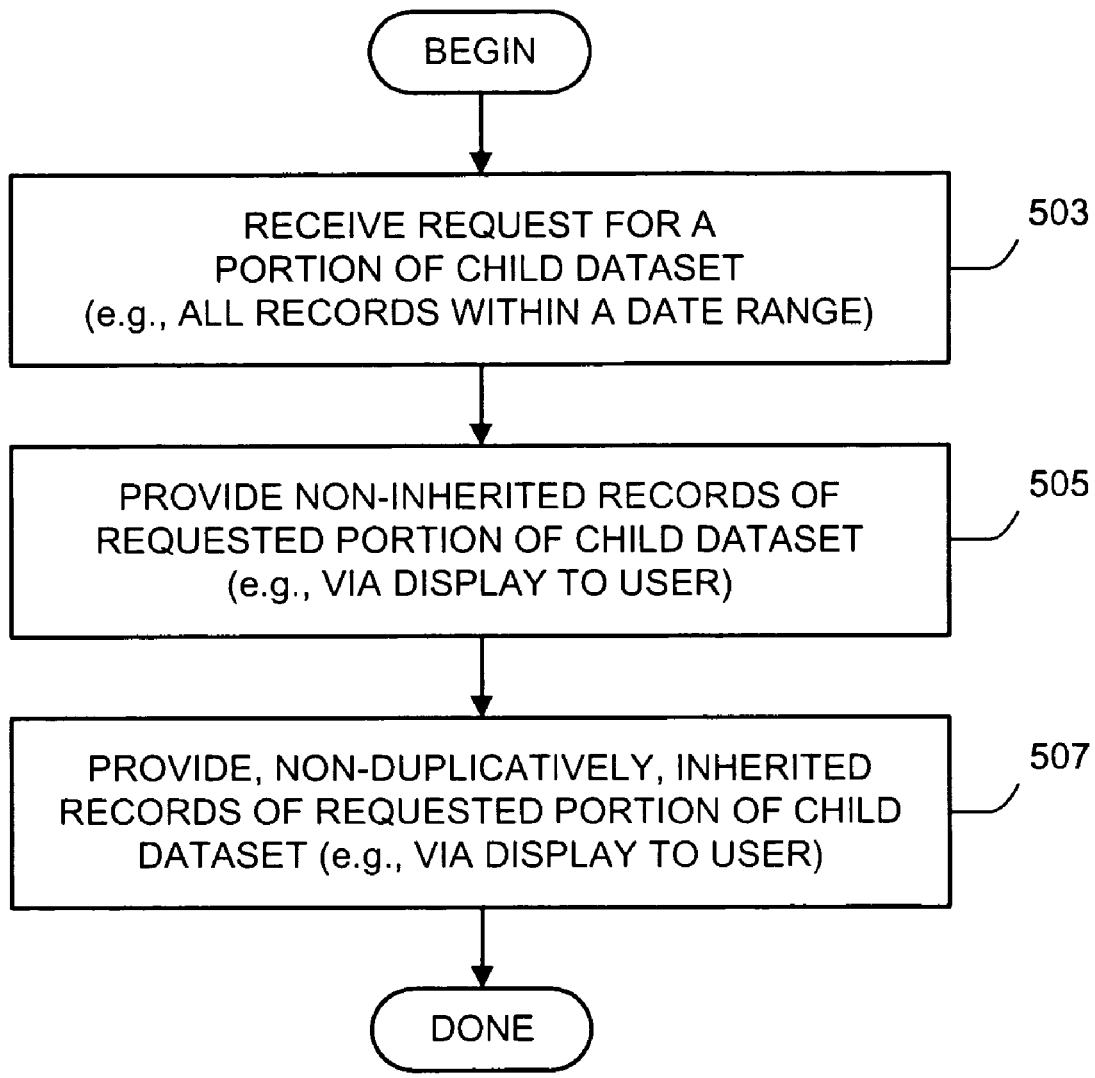
FIG. 5A is a flowchart that describes a method for providing, from a dataset, data that may include native (i.e., non-inherited) and/or inherited information.

FIG. 5A is a flowchart that describes a method 405A for providing, from a dataset, data that may include native (i.e., non-inherited) and/or inherited information, in the present invention. The method 405A is suitable for embodying the step 405 of FIG. 4A. As shown in FIG. 5A, the Infomanager 301 receives, in a step 503, a request to retrieve a portion of the dataset. Such a portion may be, for example, all records of the dataset, native or inherited, which satisfy a record filter, such as a filter that passes all event records within a date range. In response to the request, the Infomanager provides, in a step 505, non-inherited records of the requested portion of the child dataset. For example, the Infomanager may apply the filter to the non-inherited records of the child dataset, and provide those records that pass the filter. The Infomanager may apply the filter in any suitable fashion. For example, the Infomanager may compare each record of the child dataset to the filter and determine whether the record meets the filter's conditions. Preferably, the dataset's records have been pre-organized in way(s) (e.g., indexed in time order) that relates to common filter type(s), and therefore the Infomanager can use the pre-organization that corresponds to a filter type to quickly index to just the record(s) that can pass the filter. Also in response to the request for information, the Infomanager provides, in a step 507, inherited records of the requested portion of the child dataset. For example, the Infomanager may apply the filter to the inherited records of the child dataset, and provide those records that pass the filter.

B. Retrieve Local Copies over Parent Values and Suppress Duplication

1. Overview

Figure 5B:
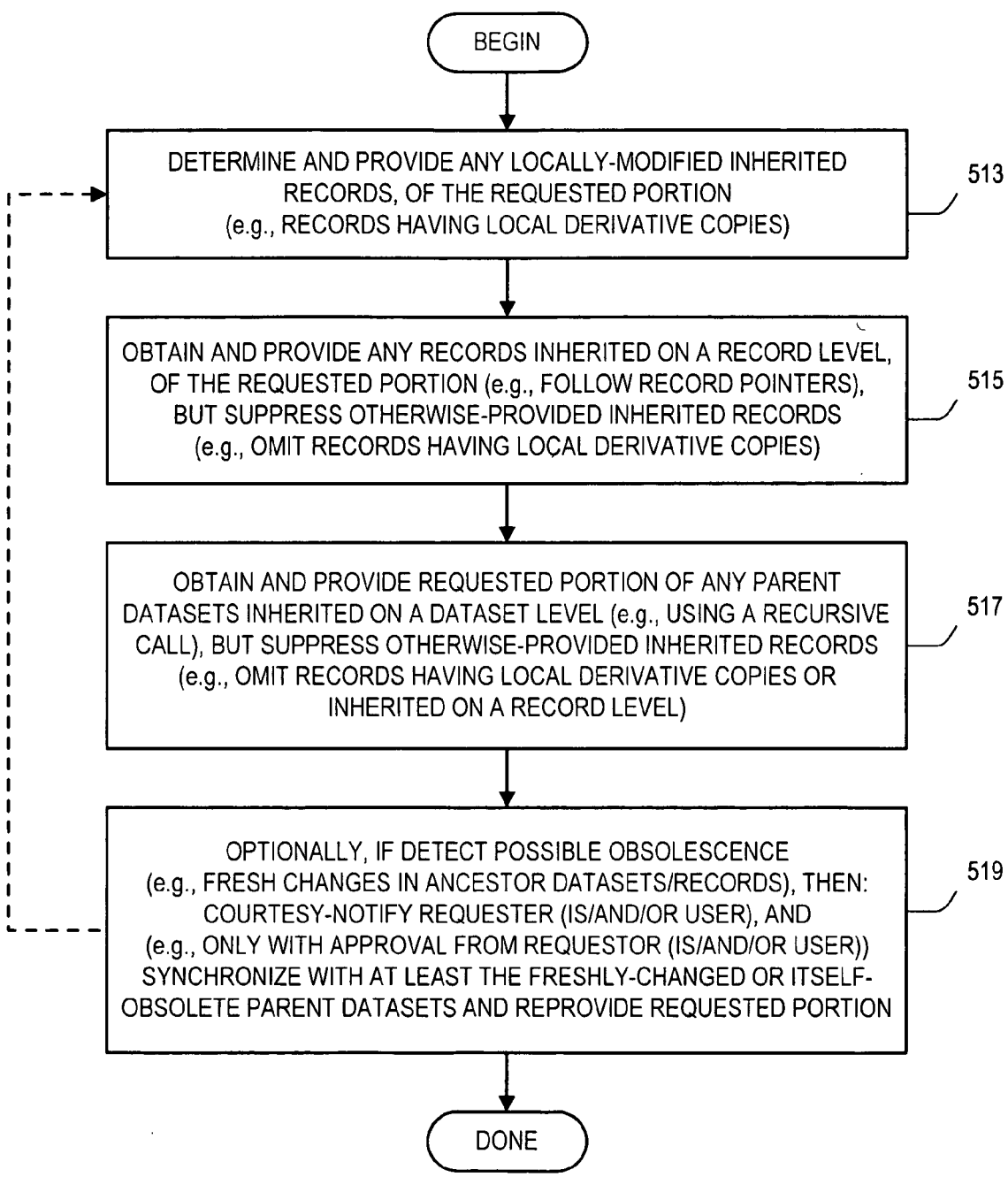
FIG. 5B is a flowchart that describes a method for providing inherited records of a requested portion of a child dataset.

FIG. 5B is a flowchart that describes a method 507A for providing inherited records of a requested portion of a particular child dataset, in the present invention. This method 507A is suitable for embodying the step 507 of the method 405A of FIG. 5A. In the method 507A of FIG. 5B, in a step 513, the Infomanager determines and provides all inherited records, of the requested portion, that have been locally-modified. In a step 515, the Infomanager obtains and provides any records inherited on a record level, of the requested portion, that are not otherwise provided. More particularly, the Infomanager obtains and provides record-level-inherited records that pass the filter but suppresses providing such records if they are already provided or will be provided by another step of the method 507A, for example, by the step 513. In a step 517, the Infomanager obtains and provides the requested portion of any parent datasets inherited on a dataset level, but refrains from providing any such records that are otherwise provided, or will otherwise be provided, for example, by the steps 513 or 515. In the preferred embodiment, the Infomanager performs the steps 513, 515, and 517 in that order. In an optional step 519, if the Infomanager determines that the particular child dataset may be obsolete due to ancestors, then the Infomanager courtesy-notifies the party (e.g., the user) that requested to retrieve records, and optionally (e.g., only with the party's permission) updates the child dataset with regard to inherited records and re-provides as necessary the inherited records.

The Infomanager may make its optional determination of possible obsolescence for the step 519 within the course of executing the steps 513, 515, and 517. The Infomanager may execute the step 519, including determining possible obsolescence, as a preliminary step, before first executing the steps 513, 515, and 517 in response to a user request to be provided with a portion of the particular child dataset. Note that, in the method 507A of FIG. 5B, as used in embodying the step 405 of FIG. 4A, the optional step 519, if it updates the child dataset, in effect would intermingle execution of at least a portion of the step 411 of FIG. 4A into the step 405 of FIG. 4A.

In general, when the method 507A is used by a user to obtain records of a child dataset, the Infomanager obtains only non-deleted records of a child dataset—i.e., the Infomanager by default adds "and is not a (logically) deleted record" to any user-selected record filter. However, the Infomanager does have the ability to invoke the method 507A, or its steps, in a manner that will obtain even (logically) deleted records. More particularly, the Infomanager can turn off the automatic appending of "and is not a (logically) deleted record" to the supplied record filter. Such use of the method 507A or its steps to provide even (logically) deleted records is important, for example, during synchronization of datasets, as will be further discussed.

2. Provide Locally-Modified Inherited Records

As mentioned above, in the step 513, the Infomanager determines and provides all inherited records, of the requested portion, that have been locally modified. The Infomanager does so, for example, by filtering all non-null local record data 441 (shown in FIG. 4B) of all locally-modified inherited records, in the child dataset, and providing the filter-passed records. (Note that, if the Infomanager does not restrict itself only to inherited records in this step 513, but rather identifies and provides all non-null and filter-passed local record data 441 of FIG. 4B in the child dataset, including data of native (i.e., non-inherited) records, then the method 507A, as modified, would implement the combined steps 505 and 507 of the method 405A of FIG. 5A.)

3. Provide (Remaining) Records that are Inherited on a Record Level

As mentioned above, in the step 515, the Infomanager obtains and provides any records inherited on a record level, of the requested portion, that are not otherwise provided, e.g., by the step 513. The Infomanager does so, for example, by obtaining and providing record-level-inherited records that pass the filter but suppressing providing of any such records that are already provided or will be provided by another step of the method 507A, for example, by the step 513. In the preferred embodiment, the Infomanager in the step 515 provides all child records inherited on a record level that have not been locally modified (because the records inherited on a record level that have been locally modified will have already been provided in the step 513). The Infomanager begins by following the record pointer 439 (shown in FIG. 4B) for each such child record inherited on a record level to reach the parent record. If the pointed-to parent record itself is an inherited record that has no local data, then the Infomanager will follow the parent record's record pointer to reach the grandparent record. The Infomanager repeats the process of following pointers through the chain of ancestor records until the Infomanager reaches an ancestor record that has local data (i.e., is not merely a pointer) (i.e., is a locally-modified inherited record or is a native record). The ancestor record that has local data, of course, is the most closely related ancestor record, of the child record, that has local data. The Infomanager then applies the filter to the local data (or to whatever data and status information that are relevant to the filter), and provides the ancestor record's local data if it passes the filter.

4. Provide (Remaining) Records that are Inherited on a Dataset Level

As mentioned above, in the step 517, the Infomanager obtains and provides the requested portion of any parent datasets inherited on a dataset level, but refrains from providing any such records that are otherwise provided, e.g., by the steps 513 or 515. The Infomanager can provide such requested portion of the parent datasets inherited on a dataset level by recursively calling the step 507A with the current filter for all parent datasets and suppressing records returned from the recursive calls that are, or will be, otherwise provided.

5. Suppress Duplicative Providing of Records

In the steps 513, 515, and 517, the Infomanager can suppress otherwise-provided records, for example, by maintaining a list of record identifiers of the parent records of already-provided child records, and, upon obtaining an inherited record in the steps 515 and 517 comparing record identifiers of the obtained (parent) records with the maintained list of record identifiers. If the record identifier of the obtained (parent) record matches a record identifier in the maintained list, then the Infomanager suppresses the obtained record from being provided again.

C. Optionally, Handle Possible Obsolescence Due, e.g., to Parent Changes

1. Optionally, Determine Possible Obsolescence

In the course of obtaining inherited records, the Infomanager optionally determines whether the particular child dataset is possibly obsolete due to parent changes. The Infomanager determines the particular child dataset to be possibly obsolete due to parent changes if any parent record has been "freshly" changed with respect to the child dataset. The Infomanager determines a parent record to be freshly changed relative to its child dataset if the provided record's parent record, as currently retrievable, has not yet been reconciled with the child dataset. More particularly, the Infomanager determines the parent record to be freshly changed relative to its child dataset if the parent record's modification time is later than the most recent time that the parent record's value was made known to the child dataset (e.g., is later than a most recent synchronization of the child dataset with the parent record).

Optionally, the Infomanager makes a further determination whether the particular child dataset is possibly obsolete due to ancestor changes, and not merely due to parent changes. The Infomanager determines the particular child dataset to be possibly obsolete due to ancestor changes if any parent record either (1) has been "freshly" changed with respect to the child dataset or (2) is itself possibly obsolete due to ancestors. Determining fresh parent changes (1) has already been discussed. With regard to possible obsolescence of the parent record (2), the Infomanager determines a parent record to be itself possibly obsolete due to ancestors in the same way, i.e., relative to the parent record's own parent record, if any, e.g., recursively. Of course, a native record, e.g., an ancestor record that is a native record, cannot be obsolete due to ancestor changes, for lack of any (further) ancestors. The Infomanager may make its optional determination of possible obsolescence due to parent and/or ancestor changes in the step 519 within the course of executing the steps 513, 515, and 517.

The Infomanager preferably keeps a user-settable setting for whether to undertake the optional step 519 at all in the method 507A and, if so, whether to detect, in addition to possible obsolescence due to parent changes, possible obsolescence due to other changes from any ancestor. In the preferred embodiment, the Infomanager's default setting is to undertake the optional step 519 to detect just possible obsolescence due to parent changes, and not to detect also possible obsolescence due to changes from any ancestor other than a parent (e.g., changes from a grandparent). One reason not to detect possible obsolescence due to changes from non-parent ancestors is that the user perhaps should not be allowed to know which parent record(s) are inherited. Another reason is that, even if a user knows a parent may be obsolete due to an ancestor record, the user typically cannot remedy the situation because the user in general may not have permission to cause its ancestor datasets to be modified (e.g., updated).

2. Optionally, Notify User and/or Remedy Possible Obsolescence

In the optional step 519, if the Infomanager has determined that the particular child dataset (e.g., particular records thereof) may be obsolete due to parent changes or due to ancestor changes, the Infomanager courtesy-notifies the party (e.g., the user) that requested to retrieve records, and optionally (e.g., only with the party's permission) updates the child dataset with regard to inherited records and re-provides as necessary the inherited records. The Infomanager can perform the updating and re-providing, for example, by invoking the step 411 of FIG. 4A to synchronize the particular child dataset with at least the relevant parent records (i.e., freshly-changed or possibly-obsolete parent records) of the relevant parent dataset(s) and then repeating the steps 513, 515, and 517 (and 519).

If the particular child dataset was determined to be possibly obsolete due to ancestor changes in general (i.e., not merely due to parent changes), then, in synchronizing the child dataset with a parent record, if the parent record is itself an inherited record, the Infomanager preferably first synchronizes the parent record with the parent record's parent record, if any, e.g., by recursively synchronizing the parent record's dataset with the parent record's dataset's parent records. Using such optional chain synchronization, the Infomanager ensures that the child dataset is not obsolete due to any ancestor record. If the user does not have permission to cause the updating of ancestor datasets (e.g., parent datasets), which is a typical situation, however, then the Infomanager will not attempt chain synchronization (and will notify the user of that fact).

V. Methodology for Directly Modifying Inherited Information in Child Dataset

A. For Updates, Establish Local Copy if Necessary and Update Local Copy

Figure 6A:
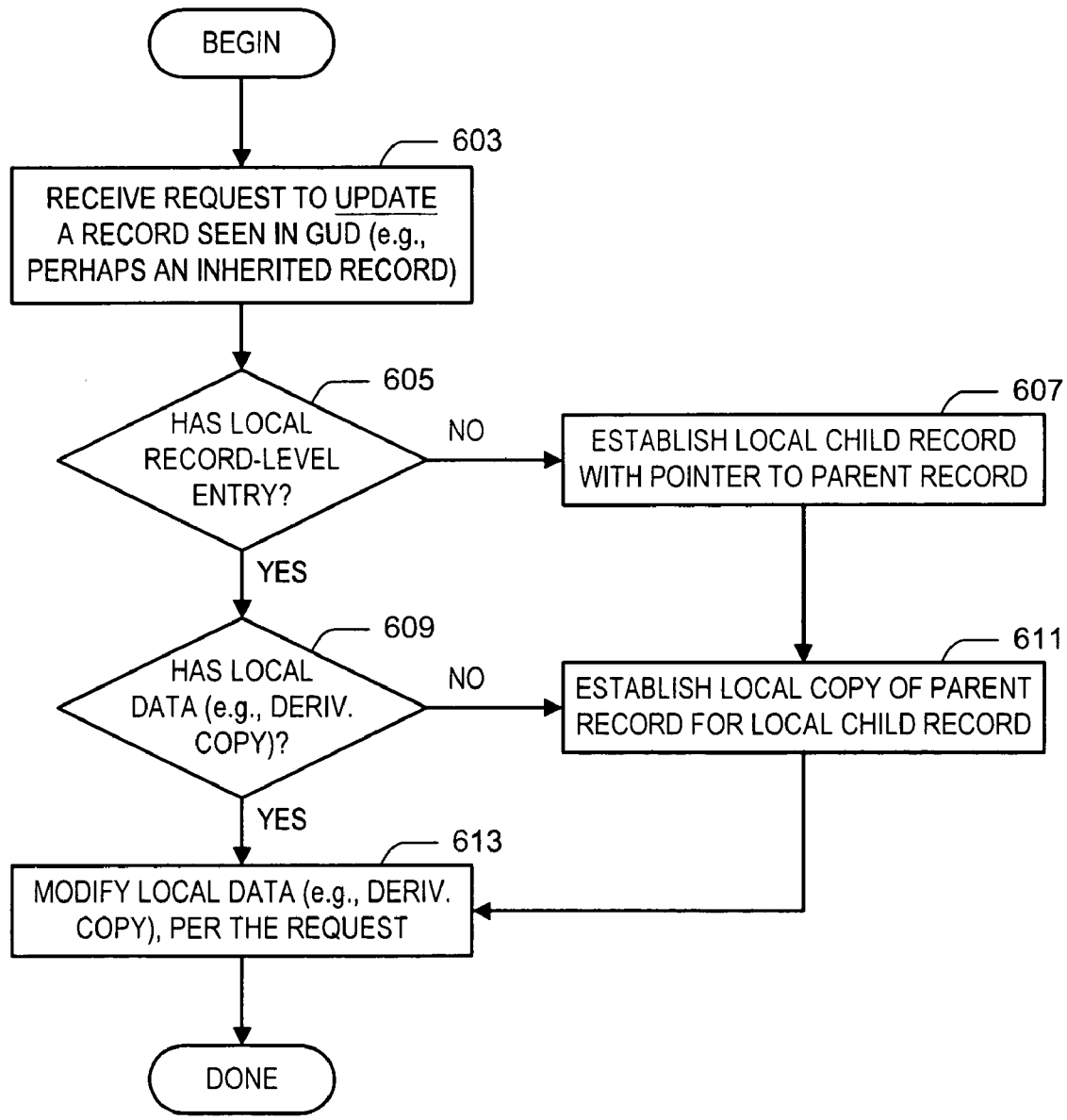
FIG. 6A is a flowchart that describes a method for updating an existing record in a dataset, whether the record is a native record or an inherited record.

As has been mentioned, the present invention provides for local modification of even inherited records. FIG. 6A is a flowchart that describes a method 409A for updating an existing record in a dataset, whether the record is a native record or an inherited record, in the preferred embodiment of the present invention. Updating a record in the method 409A includes modifying some of its data but does not include deleting the entire record. If the user requests to delete an existing child record, then the Infomanager would invoke a separate method, further discussed later. The method 409A is suitable for embodying, in part, the step 409 of FIG. 4A (namely, the part of the step 409 that handles record updates, as opposed to record deletions).

As shown in FIG. 6A, the Infomanager receives a request to update a record in a step 603. Next, in a step 605, the Infomanager determines whether the record in question has a local record-level entry. If not, the Infomanager creates a local record-level entry for the record in a step 607, as follows. If the parent record itself has no record-level entry in the parent dataset, then the Infomanager uses the step 607 recursively to first establish a record-level entry for the parent record in the parent dataset. After any such recursion, the Infomanager creates, for the child record, a record pointer to the parent record of the parent dataset. The Infomanager sets a modification time for the thereby-created record-level entry to the current time. The Infomanager also creates a "parent-record-version" field that indicates the current version of the parent record. The current version of the parent record may simply be the modification timestamp of the parent record. Note that, in the preferred embodiment, the step 607 is reached via the step 605 in the method 409A if, and only if, the record in question is a record that is inherited on a dataset level, and not on a record level, and that has not previously been locally modified.

In a step 609, the Infomanager determines whether the record in question has associated local data. If not, the Infomanager establishes a local copy of the parent record in a step 611. Note that, in the preferred embodiment, the step 611 is reached in the method 409A if, and only if, the record in question is a child record that had not previously been locally modified. Finally, in a step 613, the Infomanager updates the local data for the record-level entry for the record in question, per the user's request. For example, if the user has modified a data field within the record on a user interface, the Infomanager propagates the modification into the dataset, e.g., into the local data of the record. (The local data that is updated is either a native record's data or an inherited record's copy of the inherited record's parent record's data.)

B. An Example

It may be helpful to illustrate the method 409A with an example. Consider the following scenario under the preferred embodiment of the present invention. Initially, Alice's dataset 305A and its parent datasets are in a state as depicted in FIG. 4B. The user, Alice, has used the method 405A of FIG. 5A, including the method 507A of FIG. 5B, to retrieve a week's worth of event data records for viewing, including a record for a Giants' home game. The record for the Giants' home game was inherited on only a dataset level from the parent Giants'-schedule dataset 337 of FIG. 4B. Alice views this game's data record, selects it, and makes modifications to it on the user interface via the mouse and keyboard. Alice submits the modifications, for example, by striking a <RETURN> keyboard key or by mouse-clicking on an on-screen "submit" or "okay" command button. This corresponds to an execution of the step 603 of FIG. 6A. After the Infomanager subsequently executes the steps 607, 611, and 613 in response, the state of Alice's dataset has changed.

Figure 6B:
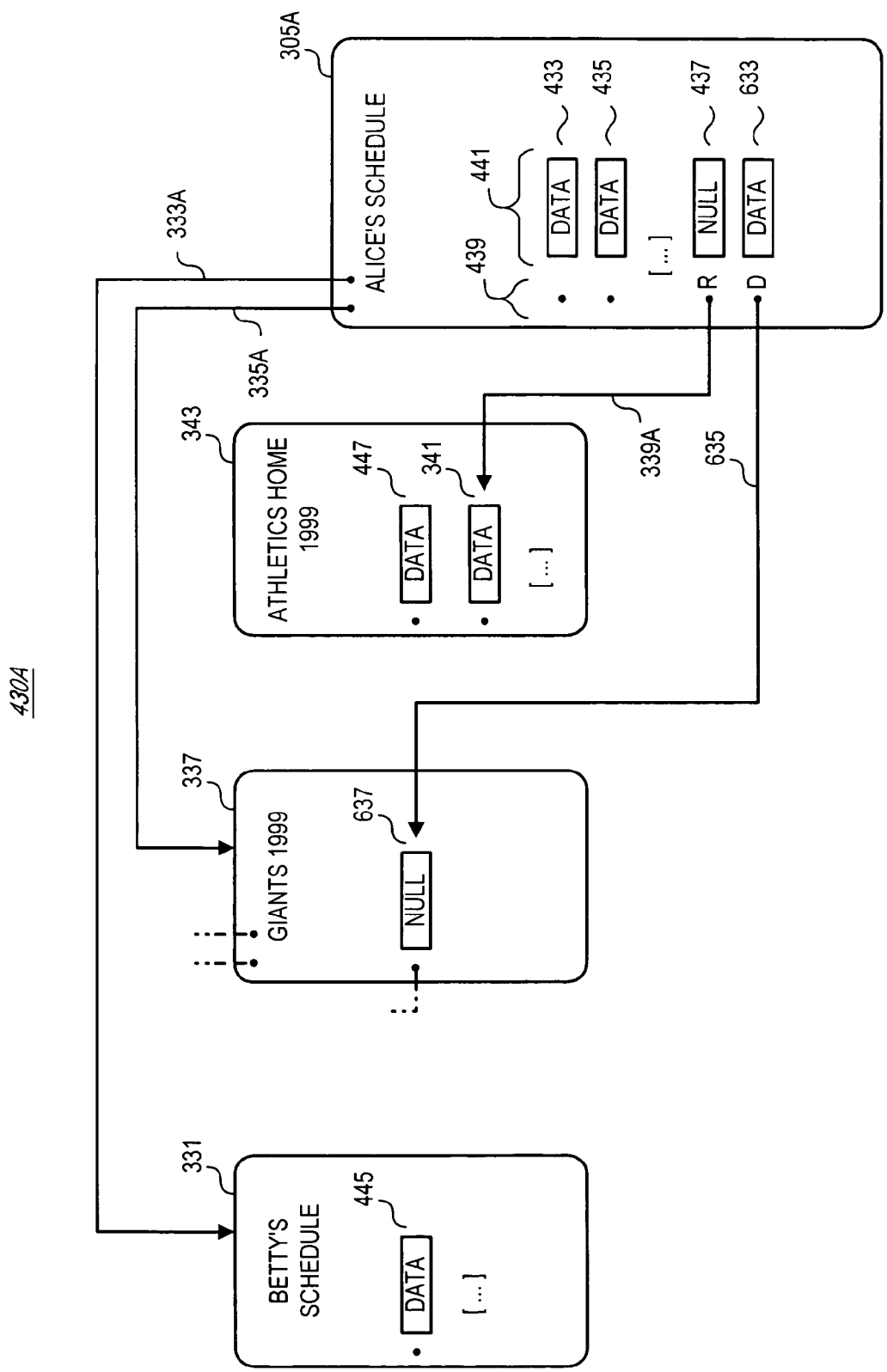
FIG. 6B is a block diagram that depicts, in part, a changed state of the datasets of FIG. 4B that results from an example local modification of a child record.

FIG. 6B is a block diagram that depicts, in part, the changed state, 430A, of Alice's dataset and its parent datasets. FIG. 6B is self-explanatory, but it may be helpful to highlight a few features. In particular, note that a new record-level entry 633 has been created for the inherited record. The new record-level entry includes a new record pointer 635 to a newly-created record-level entry 637 for the parent record. The new record pointer 635 was created by the step 607 of FIG. 6A. The new record-level entry 637 in the parent dataset was created by the step 607 of FIG. 6A via recursion. The new record-level entry 633 in the child dataset includes an indicator (shown as "D") that indicates that the child dataset is inherited on a dataset level. The indicator was created by the step 607 of FIG. 6A. As shown in FIG. 6B, the new record-level entry 633 in the child dataset includes non-null local data (shown as "DATA"). This local data corresponds to a derivative copy that was created in the step 611, and modified in the step 613, per Alice's input.

C. For Deletions, Delete any Local Copy and Optionally Stop Inheriting

The present invention supports interactive deletion of records, including inherited records, by a user via a user interface. A user may request to delete an inherited record, for example, by selecting the inherited record during viewing and pressing the <DELETE> keyboard key, or by using another similar procedure. In response to the delete request, if the record is a native record, the Infomanager deletes the native record in its ordinary way (e.g., a deletion flag is set to "true" and data fields are optionally reset to null) and is finished. In response to the delete request, if the record is a locally-modified inherited record, the Infomanager discards the local modifications. If the record is an inherited record, the Infomanager preferably further asks the user whether the user wishes to stop inheriting the record on any of the levels on which the record was being inherited—i.e., on either, neither, or both of a dataset level or a record level. The Infomanager provides a default option of stopping any record-level inheritance but not stopping any dataset-level inheritance. If the user's choice does not reflect a stopping of all inheritance of the record, then the Infomanager preferably warns the user, as a courtesy, that the user's dataset is continuing to inherit the child record and that the user will therefore continue to see the child record when viewing the child dataset. (The user's choice would not reflect a stopping of all inheritance of the record, for example, in the following scenarios: (1) the deleted record was a child record inherited on only a record level, and the user merely wanted to delete the local modifications and therefore overrode the default option and elected to retain inheritance; and (2) the deleted record was a child record inherited on a dataset level, and the user did not elect to stop inheritance of the entire parent dataset (i.e., the user did not override the default option).

Figure 6C:
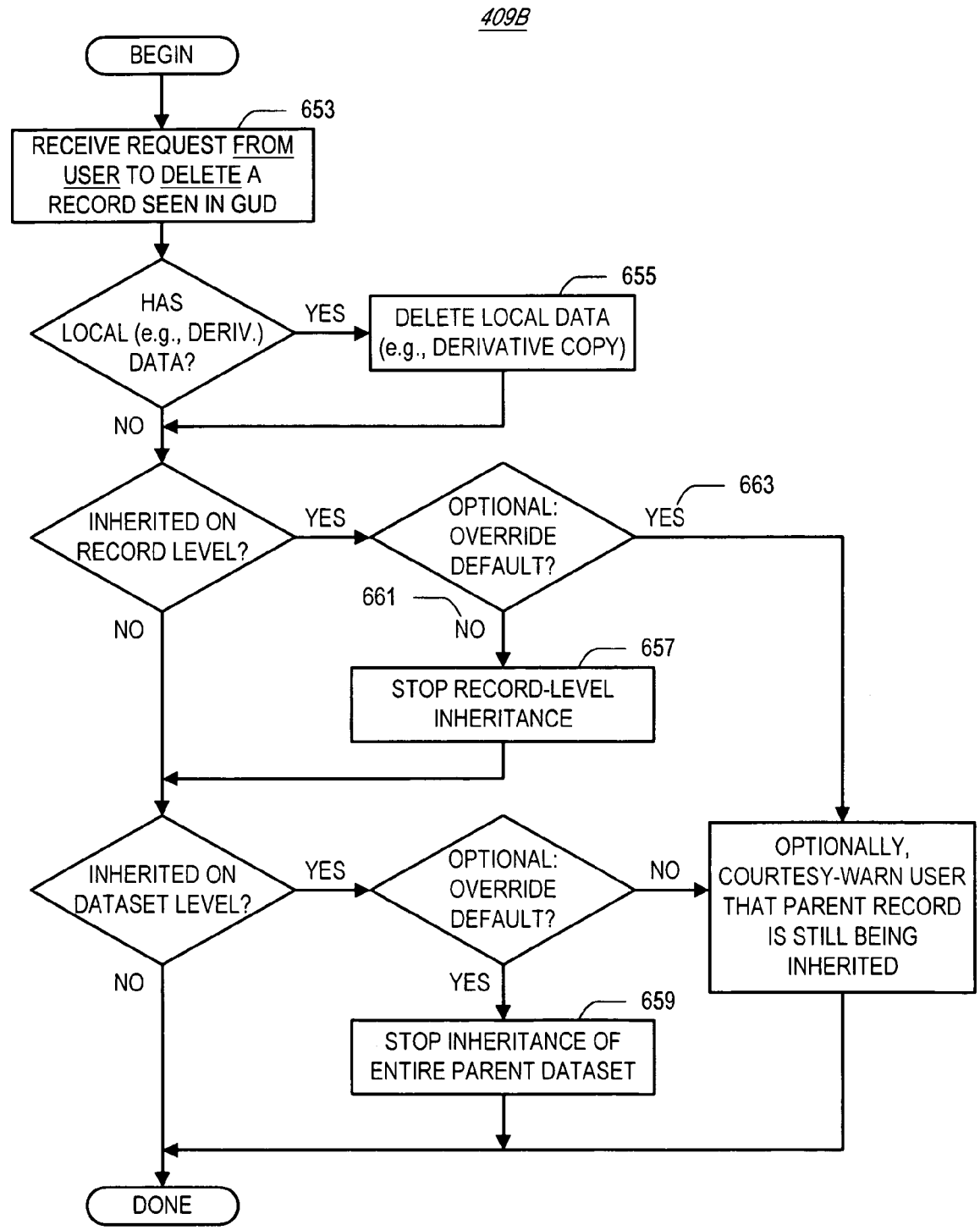
FIG. 6C is a flowchart that describes a method for handling interactive deletion requests of any record, inherited or not.

FIG. 6C is a flowchart that describes a method 409B in the present invention for handling interactive deletion requests of any record, inherited or not. The method 409B embodies the methodology discussed in the previous paragraph. The combination of the method 409A of FIG. 6A, that was discussed above, and the method 409B is suitable for embodying the step 409 of FIG. 4A. FIG. 6C is self-explanatory, but it may be helpful to point out some of its steps. As shown, the Infomanager receives the deletion request in a step 653. The Infomanager deletes any local data for the record in a step 655. As with the Starfish synchronization engines from which the Infomanager may be built, deletion of such local data is preferably accompanied by only a logical deletion of the record—i.e., a setting of a "deleted" flag to true—and preferably does not result in the actual physical deletion of the entire record-level entry. This preference is especially important if the dataset has already been synchronized in the past with other datasets, e.g., alter-ego datasets, and might need to be synchronized with such other datasets again in the future (at which time the deletion may need to be propagated to the other datasets).

The deleted local data is either a native record's data or a locally-modified child record's local derivative copy of the parent record. If the record is an inherited record, then the Infomanager optionally stops inheritance of the record in steps 657 and/or 659, either in accordance with the user's interactive instructions or in accordance with default choices that become operative in the absence of overriding user instruction. As mentioned earlier, the Infomanager's preferred default action, in the absence of counter-instructions from the user, is to stop any record-level inheritance but not to stop dataset-level inheritance. These default choices are shown, for example, by default and non-default execution paths such as paths 661 and 663, respectively.

VI. Introduction to Synchronizing a Child Dataset with its Alter-Ego Dataset(s)

A. General Overview

As will be further described in a later section, the present invention provides an inheritance-aware method for synchronizing a user dataset with other dataset(s), e.g., alter-ego datasets. This inheritance-aware method leaves the user dataset and the other datasets equivalent to one another, including inherited records within the user dataset, at least with regard to records not explicitly excluded from participating in the synchronization. Before further describing the inheritance-aware synchronization method of the present invention, it is useful to selectively review some general synchronization concepts and definitions, and a baseline synchronization method that is not inheritance-aware. A more thorough discussion of general synchronization concepts and the Starfish synchronization system(s) from which the present invention may be constructed may be found, for example, in the incorporated, commonly-owned U.S. patent applications having Ser. No. 09/311,781 (filed May 13, 1999) or Ser. No. 09/136,215 (filed Aug. 18, 1998). The explanations in the incorporated patent applications can be used to supplement the discussion in the present document, to the extent that the explanations in the incorporated patent applications are not superseded (e.g., contradicted) by the present document.

B. Overview of Synchronization Concepts

1. Datasets, Records, and Synchronization

Datasets are collections of data. According to the present invention, the purpose of synchronizing two, or more than two, datasets is to update them as necessary with information from one another so that they contain the same or equivalent data (generally, the latest data), at least in the portions of the datasets that the user has designated for synchronization. Each dataset may be organized into individual data records. For example, a dataset having contact information may be organized into records, including a record listing a "Bill Smith's" phone numbers and addresses, and another record listing a "Ted Brown's" phone numbers and addresses. In general, if records have been added to any dataset before a synchronization, then equivalent records are added to the other datasets as a result of the synchronization. Also, generally, if modifications or deletions of records have been made to one dataset before the synchronization, then equivalent modifications and deletions of corresponding records are made to the other datasets as a result of the synchronization.

2. Data Types, Record Mapping, and Data Field Mapping

In synchronizing two, or more than two, datasets, a correspondence is generally established between particular records across the datasets. For example, a contact record for "Bob Smith, of Acme Widgets" may exist in every dataset (perhaps as a result of synchronization), and these records in different datasets may correspond to one another. The records in a dataset may be of various data types, for example, a time-zone type, a contact type, a calendar-entry type, a task (or "to-do"-list-entry) type, a memo type, an electronic-mail type, or other types. In general, each record may include data organized into one or more data fields. For example, a contact-type record may include data for a "last name" field, a "first name" field, a "company" field, and many other fields. For many typical data types, it is not necessary for each record of the data type to have data for every possible field. For synchronization, a correspondence is typically established between particular data fields across datasets. For example, a "title" field for contact records in one dataset may correspond to a "Job Title" field for contact records in another dataset. In general, the systems and methodologies of the present invention can be adapted to work with any one type of data, or with any multiple types of data, and with arbitrarily defined or named data fields. For simplicity only, unless otherwise stated or unless context demands otherwise, discussion of synchronizing datasets may use language as if to assume that all datasets involved in the synchronization contain data of only a single type. It is to be understood that this simplification, and other simplifications made for ease of description, are not meant to limit the scope of the invention.

3. Conflicts and Duplicate Records

In general, the user may make arbitrary changes to individual datasets and later synchronize the datasets . . . In general, each change made to a dataset (for example, addition, modification, or deletion of a record) by its user is propagated to other datasets as a result of a subsequent synchronization. However, it sometimes happens that two, or more than two, changes are in conflict with one another such that the changes cannot all be propagated without one change's undoing, or otherwise interfering, with another. Such changes give rise to a "conflict." For example, a conflict exists when a user has made a modification to a record in a first dataset, and has separately made a conflicting modification to the record's corresponding record in a second dataset. For a specific example, the user may have set a contact's (e.g., Bob Smith's) "title" field to "salesperson" in his handheld organizer device and separately set the corresponding contact's (Bob Smith's) "title" field to "Sales Manager" on the user's desktop PIM software (Personal Information Manager). Therefore, conflict resolution is employed to resolve such conflicts.

Occasionally, the user may cause the same, or matching, information to exist in different datasets without using the present invention, and then use the present invention to synchronize the datasets. For example, the user may cause records to exist for a "Bob Smith, of Acme Widgets" in multiple datasets, either by adding such records or by modifying existing records into such records. If the definition of the contact data type requires that the first name, last name, and company information for each contact be unique, then the example records would by definition match one another. In such a situation, simple-minded propagation of each added or modified record in each dataset to all other datasets would result in a duplication of records. Therefore, duplicate resolution is employed to prevent such duplication.

C. A Baseline Synchronization Method that Lacks Inheritance Awareness

1. Introduction

Figure 7A:
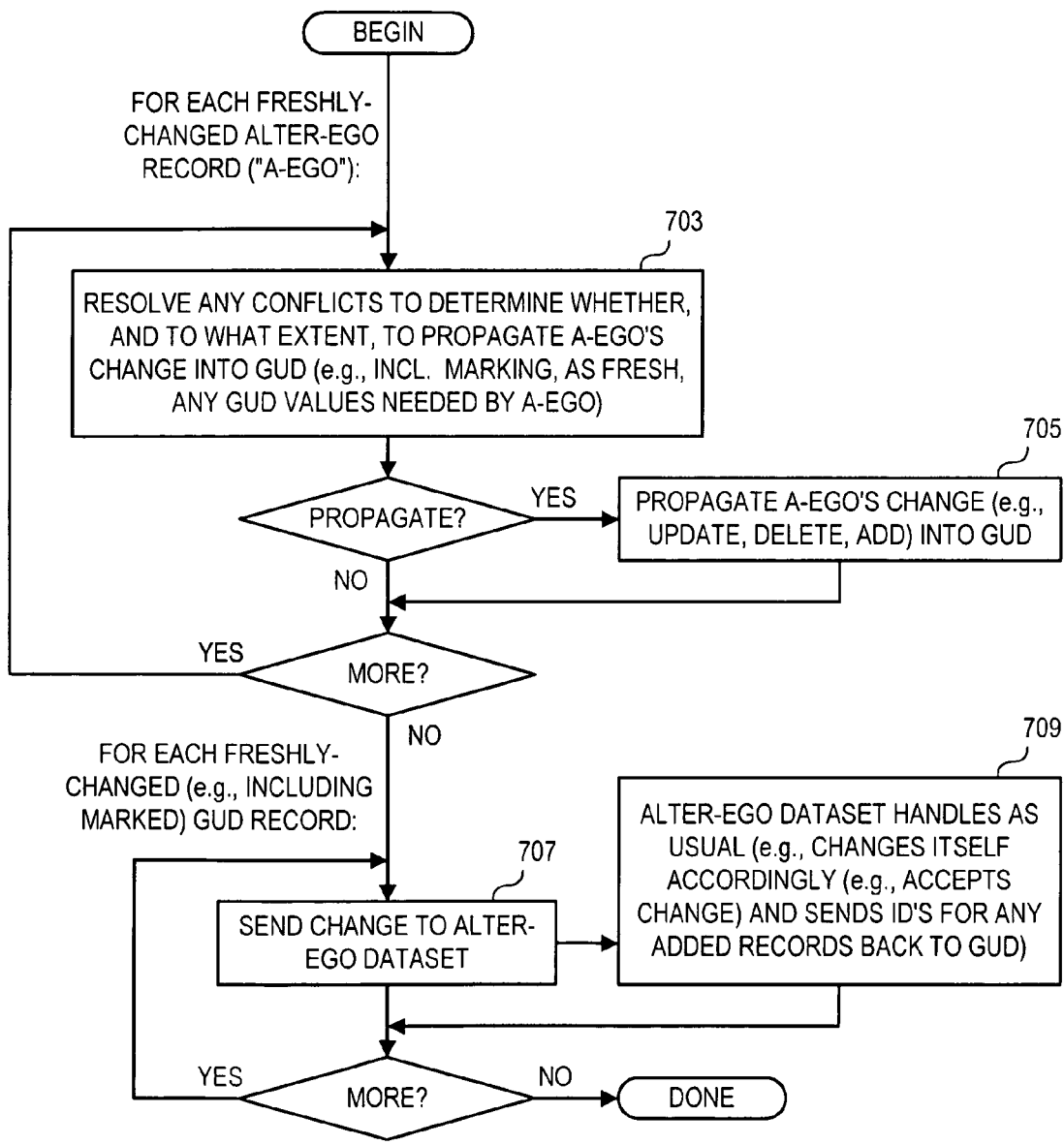
FIG. 7A is a flowchart that describes a baseline method, which does not take inheritance into account, for synchronizing a dataset with a possibly independently-modified copy (or copies) of the dataset.

FIG. 7A is a flowchart that describes a baseline method 700 for synchronizing a dataset (namely, the GUD) with alter-ego datasets. The method 700 is a method used in the prior Starfish synchronization systems ("synchronizers") from which the Infomanager of the present invention may be built. The method 700 will be briefly reviewed in this document. For more detailed discussion, please refer, for example, to the incorporated, commonly-owned U.S. patent applications having Ser. No. 09/347,447 (filed Jul. 3, 1999), Ser. No. 09/311,781 (filed May 13, 1999), Ser. No. 09/208,815 (filed Dec. 8, 1998), or Ser. No. 09/136,215 (filed Aug. 18, 1998).

2. Inbound Phase: Obtain Changes, Resolve Conflicts, and Accept

In the method 700, the synchronizer obtains the records that have been "freshly" changed (e.g., updated, deleted, or added) in each of the alter-ego datasets being synchronized. The changes are considered to have been "freshly" made because the synchronizer believes that this may be the first time the synchronizer is being made aware of the changes. The method for obtaining such fresh changes may be as described in the incorporated patent applications for the particular underlying Starfish synchronizer. For example, in one such synchronizer, the Infomanager may obtain the fresh changes by sending a request to each alter-ego dataset to provide all changes having a priority time (e.g., the time of modification by the user) that is later than the alter-ego dataset's respective time of last synchronization with the GUD. The synchronizer handles each such change as follows.

In a step 703, the synchronizer reviews a fresh change that had been made to an alter-ego record in the alter-ego dataset, and compares the change to the alter-ego record's corresponding record, if any, including its status information, in the GUD. Based on the comparison result, the synchronizer determines whether the change should be propagated to the GUD. If the synchronizer decides to propagate all or some of the change to the GUD, the synchronizer propagates the all or some of the change into the GUD in a next step 705. The step 703 is a conflict resolution step, and preferably the conflict resolution includes duplicate resolution. Conflict resolution may be fully automatic, and operate only according to rules, or manually assisted, in which case the rules may be bypassed or overridden by interactive input from the user who views the conflicting records and chooses winning record fields. The synchronizer repeats the steps 703 and 705 for every fresh change from every alter-ego dataset participating in the synchronization. These steps constitute an inbound phase of the synchronization.

An example of automatic duplicate resolution is as follows. If the change is a freshly added alter-ego record, then the synchronizer determines whether the added record duplicates any record already in the GUD. If the added record does not duplicate an existing GUD record, the synchronizer determines to add a copy of the alter-ego record to the GUD. If the added record does duplicate an existing GUD record, the synchronizer takes appropriate remedial steps, as described, for example, in the incorporated patent applications.

An example of remedial steps is as follows. The synchronizer may (1) add a new GUD record, (2) map the new GUD record to the fresh alter-ego record, (3) merge the data of the existing GUD record and the data of the fresh alter-ego record into either the new GUD record or the existing GUD record, and then (4) delete the other of the new GUD record or the existing GUD record. In this way, one of the two GUD records will be deleted, to leave only a single and updated GUD record of the two GUD records. In the outbound phase, the alter-ego dataset will consequently be made to have only a single counterpart to the single and updated GUD record (e.g., the counterpart of the deleted GUD record will be deleted, and if necessary the counterpart of the updated GUD record will be updated). In merging the data of two records into one record, a conflict resolution rule (e.g., latest priority time wins) is used, preferably on a field-by-field basis. An alternative example of remedial steps is as follows. The synchronizer may simply map the freshly-added alter-ego record to the preexisting GUD record and treat the freshly-added alter-ego record as a freshly-updated record, if the preexisting GUD record was not already mapped to any record in the alter-ego record and no other problems apparently exist. (These other problems may include, for example, incompatibility between the fresh alter-ego record and records in third-party datasets to which the GUD record is already mapped.) Duplicate resolution, including the just-discussed example remedial steps and alternative example remedial steps, is further described in the incorporated, commonly-owned U.S. patent application having Ser. No. 09/347,447 (filed Jul. 3, 1999).

An example of automatic non-duplicate conflict resolution is as follows. If the received fresh change is an update to an alter-ego record that has previously been mapped to a corresponding GUD record, then the synchronizer compares the alter-ego record's modification timestamp to priority times stored in the GUD for each of the record fields of the GUD record that corresponds to the alter-ego record. For any field in which the updated alter-ego was modified more recently than the GUD record field's priority time, the alter-ego record's field is considered to be the latest and most correct field, and the synchronizer determines to update the GUD record field with the updated field from the alter-ego record. Conflict resolution is more fully described in the incorporated patent applications.

3. Outbound Phase: Send Changes, which are then Processed

After the inbound phase, the synchronizer finishes the synchronization by performing an outbound phase. In particular, the synchronizer sends, to each alter-ego dataset, all changes in the GUD that are fresh with respect to the alter-ego dataset. For each change, this sending is performed in a step 707. For each change, the recipient alter-ego dataset handles the change in its manner in a step 709. In general, under certain assumptions (e.g., that only the synchronization method can cause dataset changes during a synchronization, as is further described, for example, in the incorporated, commonly-owned U.S. patent application having Ser. No. 09/311,781 (filed May 13, 1999)), the recipient alter-ego dataset may simply accept the change from the GUD without question because the GUD records have already been conflict-resolved in the inbound phase. The recipient alter-ego dataset and the synchronizer also exchange necessary status information in the step 709. For example, if the recipient alter-ego dataset has added a new record to itself in response to the step 707, the recipient alter-ego dataset sends the synchronizer the newly-assigned internal record identifier of the new record within the recipient alter-ego dataset, for inclusion by the synchronizer into the GUD into a mapping table that will record the correspondence of the newly-added alter-ego record to the corresponding GUD record.

VII. Method to Synchronize, with Inheritance-Awareness, Child and Alter-Ego Datasets A. Overview As an improvement over the just-described baseline synchronization method, an inheritance-aware synchronization method of the present invention can synchronize inherited records, even ones that have been locally modified. In particular, a sequence such as the following example sequence is supported under the inheritance-aware synchronization method. In the example sequence, the inheritance-aware synchronization method conducts a first synchronization in which it propagates (adds) an inherited record of the GUD into an alter-ego dataset for the first time. Later, the user modifies the alter-ego dataset's copy of the inherited record in the alter-ego dataset. Later, in a subsequent synchronization of the GUD and the alter-ego dataset, the inheritance-aware synchronization method propagates the alter-ego dataset's modification back into the inherited record, subject to any conflict resolution. Note that the conflict resolution is triggered if the inherited record and/or its parent record has also changed since the first synchronization. In general, as is further described, despite the local changes that are allowed to be made to an inherited record, e.g., by the user interactively and/or by the Infomanager during synchronization, the Infomanager is still capable of modifying the inherited record in the GUD with changes from its parent record, with machine assistance, to keep the inherited record up-to-date relative to the parent record.

Figure 7B:
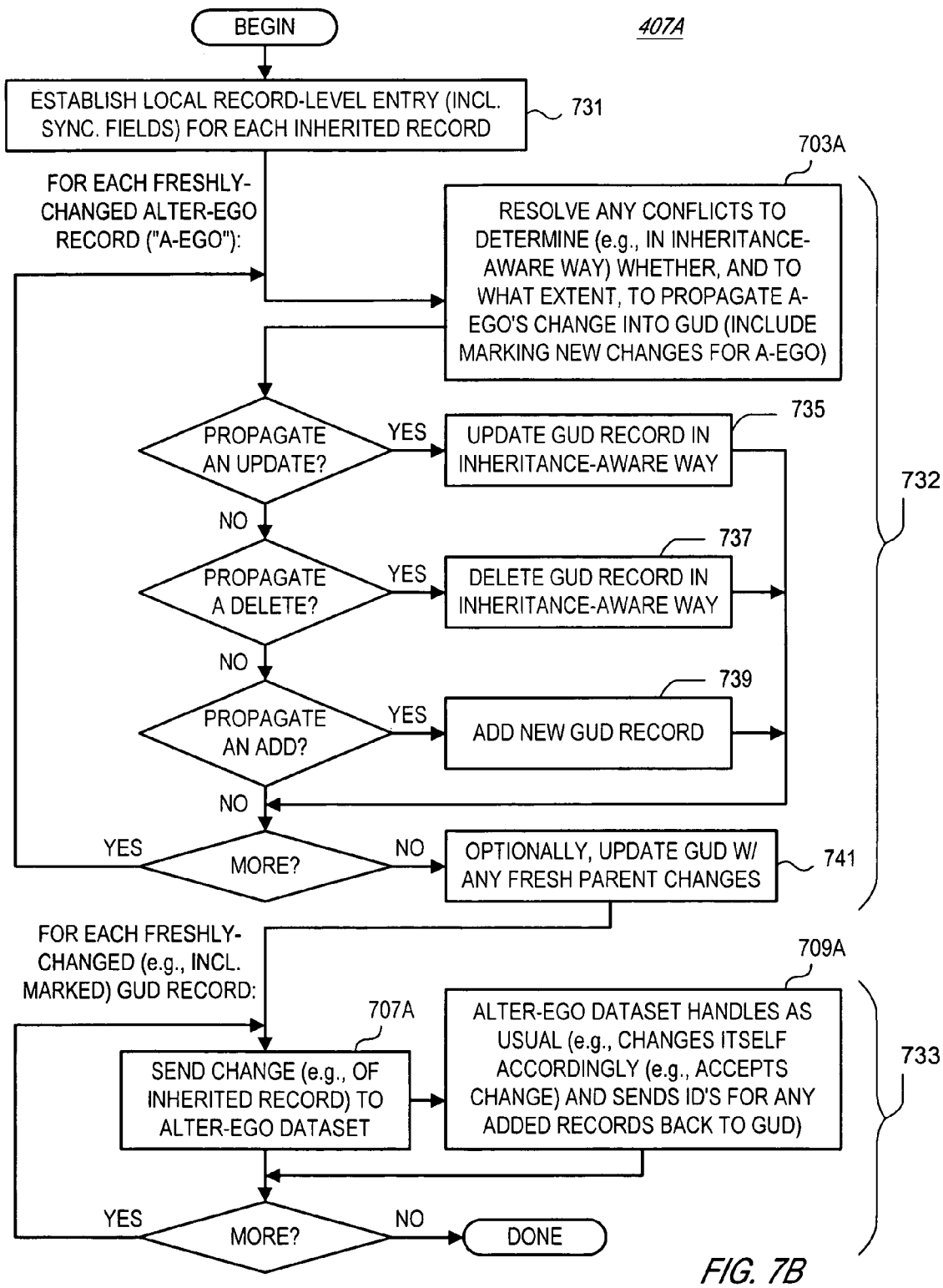
FIG. 7B is a flowchart that describes an inheritance-aware synchronization method for synchronizing a dataset with a possibly independently-modified copy (or copies) of the dataset.

FIG. 7B is a flowchart that describes the inheritance-aware synchronization method 407A, of the present invention. The method 407A is used to synchronize the GUD with one or more alter-ego datasets. Thus, the method 407A is suitable for embodying the step 407 of FIG. 4A. As an option, the method 407A also synchronizes the GUD, and the alter-ego dataset(s) being synchronized, with the GUD's parent records. Thus, used in this optional way, the method 407A is suitable for embodying a combination of the steps 407 and 411 of FIG. 4A.

In a preliminary step 731, the Infomanager establishes a record-level entry for each inherited record that does not already have a record-level entry. In the preliminary step 731, the Infomanager also establishes synchronization status fields for the record-level entry of each inherited record that lacks such synchronization status fields. In an inbound phase 732, the Infomanager obtains and handles fresh changes from alter-ego datasets, and, optionally, fresh changes from parent datasets, by resolving any conflicts involving the changes and propagating conflict-resolved changes into the GUD. In an outbound phase 733, the Infomanager determines the changes that have been made to the GUD that are fresh with respect to any alter-ego dataset, and sends such changes to the appropriate alter-ego datasets for possible propagation into the alter-ego datasets. Fresh changes that have been made to the GUD may include, for example, fresh changes propagated into the GUD in the inbound phase 732. The steps of the method 407A, including steps within the inbound and outbound phases 732 and 733, are further described below.

B. Preliminarily, Create Necessary Data Structures (e.g., Record-Level Entries)

In the step 731, in creating record-level entries, the Infomanager preferably executes the step 607 of the method 409A of FIG. 6A for each record-level entry to be created. In particular, in the step 731 of FIG. 7B, the Infomanager creates the record-level entries and creates for each record-level entry a record pointer to the parent record, as the parent record exists in the parent dataset, and a "parent-record-version" field that indicates the current version of the parent record (e.g., the parent record's modification timestamp). (The parent-record-version field is useful for conflict resolution, and will be further discussed.) The Infomanager also creates synchronization status fields for each inherited record that does not already have such fields. Synchronization status fields are discussed in the incorporated patent applications that discuss the Starfish synchronization systems from which the Infomanager may be built. Synchronization status fields preferably include, for example, all fields found in "record-mapping tables" of the relevant Starfish synchronization system from which the Infomanager is built.

C. Obtain and Handle, with Inheritance-Awareness, Fresh Alter-Ego Changes

1. Introduction

In the inbound phase 732 of FIG. 7B, the Infomanager obtains the alter-ego records that have been "freshly" changed (e.g., updated, deleted, or added) in each of the alter-ego datasets being synchronized. In general, the Infomanager obtains these records in the same manner as did the baseline synchronizer in the inbound phase of the baseline method 700 of FIG. 7A. For example, in one embodiment, the Infomanager may obtain the fresh changes by sending a request to each alter-ego dataset to provide all changes having a modification time that is later than the alter-ego dataset's respective time of last synchronization with the GUD. The Infomanager handles each such change as follows.

2. Resolve, with Inheritance-Awareness, Conflicts Involving Changes a. Introduction In the inbound phase 732, in a step 703A, the Infomanager reviews (e.g., receives and reviews) a fresh change from an alter-ego dataset and compares the change to a corresponding record, if any, in the GUD to determine whether the change should be propagated to the GUD. This is the conflict resolution step, which preferably includes duplicate resolution. In general the conflict resolution step 703A may proceed in the same manner as the baseline conflict resolution step 703 of FIG. 7A, except that the step 703A includes inherited records, whereas the step 703 of FIG. 7A does not include inherited records. Preferably, the conflict resolution step 703A is inheritance-aware, e.g., dependent on the inheritance status of records being conflict-resolved.

b. Resolve Conflicts Manually if Parent Change Involved

In the preferred embodiment of the present invention, any conflict involving a native GUD record (i.e., non-inherited) is preferably resolved automatically (e.g., by a "latest change wins" rule). In contrast, a conflict involving inherited GUD records is preferably resolved, depending on certain factors, either automatically or with manual assistance from the user. For example, the preferred embodiment of the Infomanager handles a conflict involving inherited GUD records as follows. If the conflict may involve a change from a parent dataset, the preferred Infomanager uses manually-assisted conflict resolution. Otherwise, i.e., if the conflict does not involve a change from a parent dataset, then the preferred Infomanager initiates automatic conflict resolution (e.g., by the "latest change wins" rule without requiring user help for the specific record).

In the preferred embodiment of the Infomanager, the Infomanager determines a received change from an alter-ego dataset to be a conflict that may involve a change from a parent dataset if the latest version of the parent record known to the GUD record (e.g., the parent-record-version field of the GUD record) differs from the latest version of the parent record known to the alter-ego record. Conversely, the preferred Infomanager determines a conflict between an alter-ego record and its corresponding GUD record not to involve a change from a parent dataset if the latest version of the parent record known to the GUD record does not differ from the latest version of the parent record known to the alter-ego record.

c. Further Discussion of the Parent Record Version

As might already be clear, the parent-record-version field is useful for indicating a version of the parent record whose values have already been accounted for in an inherited record when the user made his or her local modification to the inherited record. The parent-record-version field for any inherited record is preferably only ever changed at the instigation of the Infomanager itself during synchronization with the inherited record's parent record, and not arbitrarily by the user in the GUD or in any alter-ego dataset. When an inherited GUD record is first synchronized to an alter-ego dataset, i.e., is propagated to the alter-ego dataset as an added alter-ego record, the Infomanager causes information to be maintained such that in a subsequent synchronization, the Infomanager will know the known parent record version corresponding to the alter-ego record. For example, the Infomanager may store a copy of the GUD record's parent-record-version field for each particular alter-ego dataset to which the GUD record has been synchronized (e.g., in the GUD's mapping table for the particular alter-ego dataset.) For another example, the Infomanager may send a copy of the GUD record's parent-record-version field to each particular alter-ego dataset, to be maintained there, and to be sent back unchanged with subsequent changes that are made to the alter-ego record.

3. Propagate, with Inheritance Awareness, Conflict-Resolved Changes

In the inbound phase 732, in a step 735, if the change from the alter-ego dataset is a record update, and the Infomanager had decided in the step 703A to propagate the record update into the GUD, then the Infomanager propagates the record update into the GUD record that corresponds to the alter-ego record in an inheritance-aware way. For example, the step 735 may be implemented by calling the method 409A of FIG. 6A for updating records, including inherited records. The method 409A is inheritance-aware in that it performs different operations, as explained earlier, depending on whether the record being updated is a native record or an inherited record.

In a step 737, if the change from the alter-ego dataset is a record deletion, and the Infomanager had decided in the step 703A to propagate the record deletion into the GUD, then the Infomanager propagates the record deletion into the GUD by deleting the GUD record that corresponds to the alter-ego record, in an inheritance-aware way. For example, the step 737 may be implemented as a variation of the method 409B of FIG. 6C that deletes records, including inherited records. In particular, if the record is a native record, the Infomanager deletes the native record in its ordinary way (e.g., sets a deletion flag to "true" and optionally resets data fields to null) and is finished. If the record is a locally-modified inherited record, the Infomanager discards the local modifications (e.g., the local derivative copy). After this point, the step 737 preferably differs from the method 409B of FIG. 6C in default behavior. In particular, after this point, if the record is an inherited record, the Infomanager preferably does not, by default, take any action to stop inheriting the inherited record. In short, if the flowchart of FIG. 6C is modified by swapping the execution paths 661 and 663 such that by default the step 657 is not taken, then the resulting flowchart would depict the preferred embodiment of the step 737 of FIG. 7B.

In a step 739, if the change from the alter-ego dataset is a record addition, and the Infomanager had decided in the step 703A to propagate the record addition into the GUD, then the Infomanager propagates the record addition into the GUD by adding a GUD record and recording its correspondence to the alter-ego record. Note that the record addition cannot correspond to an inherited record (other than via duplicate resolution, which has already been handled within the step 703A).

The Infomanager repeats the steps 703A and, as necessary, the steps 735, 737, and 739 for every fresh change from every alter-ego dataset participating in the synchronization. After these steps have been fully performed for all fresh changes, the GUD contains data records that are conflict-free with regard to all just-seen fresh changes from the alter-ego datasets and with regard to all changes made to the GUD that are fresh with regard to any alter-ego dataset. (Freshness of GUD changes with regard to alter-ego datasets will be further discussed.)

D. Optionally, Also Synchronize with Parent Datasets Before Outbound Phase

1. Overview

As mentioned earlier, as an option, the method 407A also synchronizes the GUD, and the alter-ego dataset(s) being synchronized, with the GUD's parent records. The Infomanager handles this optional synchronization with the GUD's parent records in an optional step 741. In the optional step 741, the Infomanager optionally updates the GUD, subject to conflict resolution, with all fresh changes from the GUD's parent dataset(s) that are fresh with respect to the GUD. The optional step 741 may be implemented as an instance of the step 411 of FIG. 4A followed by an instance of the step 731 of FIG. 7B. Note that the optional step 741, in effect, intermingles parents-to-GUD synchronization into GUD-and-alter-ego-datasets synchronization. (More particularly, the optional step 741 intermingles the parent-synchronization step 411 of FIG. 4A into the alter-ego-synchronization step 407 of FIG. 4A, as embodied by the step 407A of FIG. 7B.)

2. Preferably, Resolve any Parent Conflicts with Manual Assistance

The methodology underlying the optional step 741 (e.g., the step 411 of FIG. 4A) will be further discussed in a later section. For now, it may be helpful simply to note that the optional step 741 includes conflict resolution between each parent record that is freshly changed with respect to the GUD and any locally-modified version of that parent record. Such conflict resolution by definition involves a change from a parent dataset and preferably is performed using manual assistance. Note also that, if a parent record has been freshly changed, and the freshly-changed parent record is synchronized with its child record in the GUD, e.g., in the optional step 741, then the parent-record-version field of the child record is updated to identify the version of the freshly-changed parent record—e.g., is updated to be the modification time of the parent record.

3. Preferably, Handle Parent Changes after Alter-Ego Changes

For any one child record in the GUD, it is preferable to perform all automatic conflict resolutions involving the one child record before performing manually-assisted conflict resolutions involving the one child record. Since any conflict resolution in the step 741 is preferably performed with manual assistance, whereas conflict resolution in the step 703A may be performed automatically (e.g., if no parent-version differences exist, as discussed earlier), it is preferred that, if the method 407A is to include execution of the optional step 741, then the optional step 741, as applied to a particular inherited GUD record, should be performed after all execution(s) of the step 703A for the particular inherited GUD record. Put more simply, in each single synchronization, the Infomanager preferably handles an alter-ego change for a GUD record before handling a parent change for the same GUD record, especially if the alter-ego change for the GUD record involves a conflict that is to be automatically resolved. In the previous sentence, the "single synchronization" refers, for example, to any synchronization taken in response to a single user request or to any such synchronization, between the GUD and at least one alter-ego dataset, completed within about ten minutes of the synchronization's user-initiated start. The optional step 741 specifically treats child and parent records with an understanding that they are child and parent records, and the optional step 741 is inherently inheritance-aware.

To understand the reason for the above-mentioned preferred ordering and methods of conflict resolution, it is helpful to observe the following distinction between alter-ego changes and parent changes. Alter-ego changes are likely to be changes directly made by the GUD's user/owner himself or herself. Therefore, automatic conflict resolution in which the latest user-made change takes precedence is likely to make sense because the user is hopefully aware and sensible enough not to directly make an already-obsolete change. In contrast, parent changes are likely to be changes made by a parent entity other than the user. In such a situation, automatic conflict resolution in which the later of a user-made change and a parent-entity-made change takes precedence may not make as much sense, and manually-assisted conflict resolution may be helpful. In manually-assisted conflict resolution, the user essentially picks a "winning" version of a record, or of a record field(s), from multiple conflicting versions. By handling alter-ego changes first, in any single synchronization, and automatically resolving each record's conflicts down to just a single "winning" record, the Infomanager in effect troubles the user only once for each record in a final manually-assisted conflict resolution. Further, by using the preferred methodology, the Infomanager, in this final manually-assisted conflict resolution for any record, offers the user a choice between only the latest user-made values (from the GUD and the alter-ego datasets) and the latest parent-made values (e.g., non-user-made values).

E. Send Fresh GUD Changes, which are then Processed by Alter-Ego Datasets

1. Introduction

Still referring to FIG. 7B, after the inbound phase 732, the Infomanager finishes the synchronization by performing the outbound phase 733. In particular, the Infomanager sends, to each alter-ego dataset, all changes in the GUD that are fresh with respect to the alter-ego dataset. The fresh changes may include changes to inherited records. The fresh changes may also include changes that were made to the GUD in the inbound phase 732. For each fresh change, the Infomanager performs the sending of changes in a step 707A.

2. Determine Freshly-Changed Native GUD Records

In general, the Infomanager identifies fresh changes to native records in the manner of whatever particular Starfish synchronization engine from which the Infomanager was built. For example, the Infomanager in an embodiment may identify, as fresh changes to native records in the GUD with respect to a particular alter-ego dataset, those native GUD records that have been modified since the last time the GUD was synchronized with the particular alter-ego dataset.

3. Determine Freshly-Changed Child GUD Records

In general, the Infomanager in the embodiment preferably identifies fresh changes to inherited records in the GUD according to a same definition as the Infomanager uses to identify fresh changes to native records in the GUD, except that the changed records may be found in parent datasets instead of in the GUD's local storage. For example, if fresh native records are those records modified after a previous synchronization time, then fresh inherited records are those inherited records modified after the previous synchronization time. The Infomanager defines the modification time of an inherited record, for determining freshness relative to any alter-ego dataset, in the following way. For a locally-modified inherited record, the modification time is the time of the record's local modification. For an inherited record that is not locally modified (e.g., an inherited record that is purely a record pointer), the modification time is the later of the time that the record pointer came into existence (e.g., when the Infomanager started a record-level entry for the child record in the GUD) and the modification time of the inherited record's parent record. Of course, the modification time of the parent record is defined, and may be determined in the same manner, e.g., recursively.

Note that the determination of freshly-changed GUD records, including native and inherited GUD records, in the step 707A may be implemented using a call, for each alter-ego dataset participating in the synchronization, to the step 405A of FIG. 5A to retrieve GUD records that are freshly changed with respect to the alter-ego dataset. In each such call to the step 405A of FIG. 5A, for an alter-ego dataset, the freshness criteria for the alter-ego dataset is used as the data-record filter. For example, the freshness criteria with respect to an alter-ego dataset may be "modified after time X", wherein X is the time of the previous synchronization between the GUD and the alter-ego dataset. (For example, the Infomanager preferably had recorded the time X in the GUD, for the alter-ego record, during the last synchronization with the alter-ego record.) Of course, for implementing the step 707A, the step 405A of FIG. 5A (including, e.g., its step 507), would include, and use, the definition described above for modification time, in applying the filter.

4. Handle the Received Fresh GUD Changes in the Alter-Ego Datasets

The Infomanager sends, to each alter-ego dataset participating in the synchronization, the GUD records that were determined to be freshly changed with respect to the alter-ego dataset. For each change, in a step 709A, the recipient alter-ego dataset handles the change in the alter-ego dataset's manner. In general, under certain assumptions (e.g., that only the synchronization method can cause dataset changes during a synchronization), the recipient alter-ego dataset may simply accept the change from the GUD because the GUD records have already been conflict-resolved in the inbound phase. The recipient alter-ego dataset and the Infomanager also exchange necessary status information in the step 709A. For example, if the recipient alter-ego dataset has added a new record to itself in response to the step 707A, the recipient alter-ego dataset will send the Infomanager the newly-assigned internal record identifier of the new record, for inclusion into the GUD in a mapping table that will record the correspondence of the newly-added alter-ego record to the corresponding GUD record, as is further described, for example, in the incorporated, commonly-owned U.S. patent application having Ser. No. 09/311,781 (filed May 13, 1999).

Figure 8A:
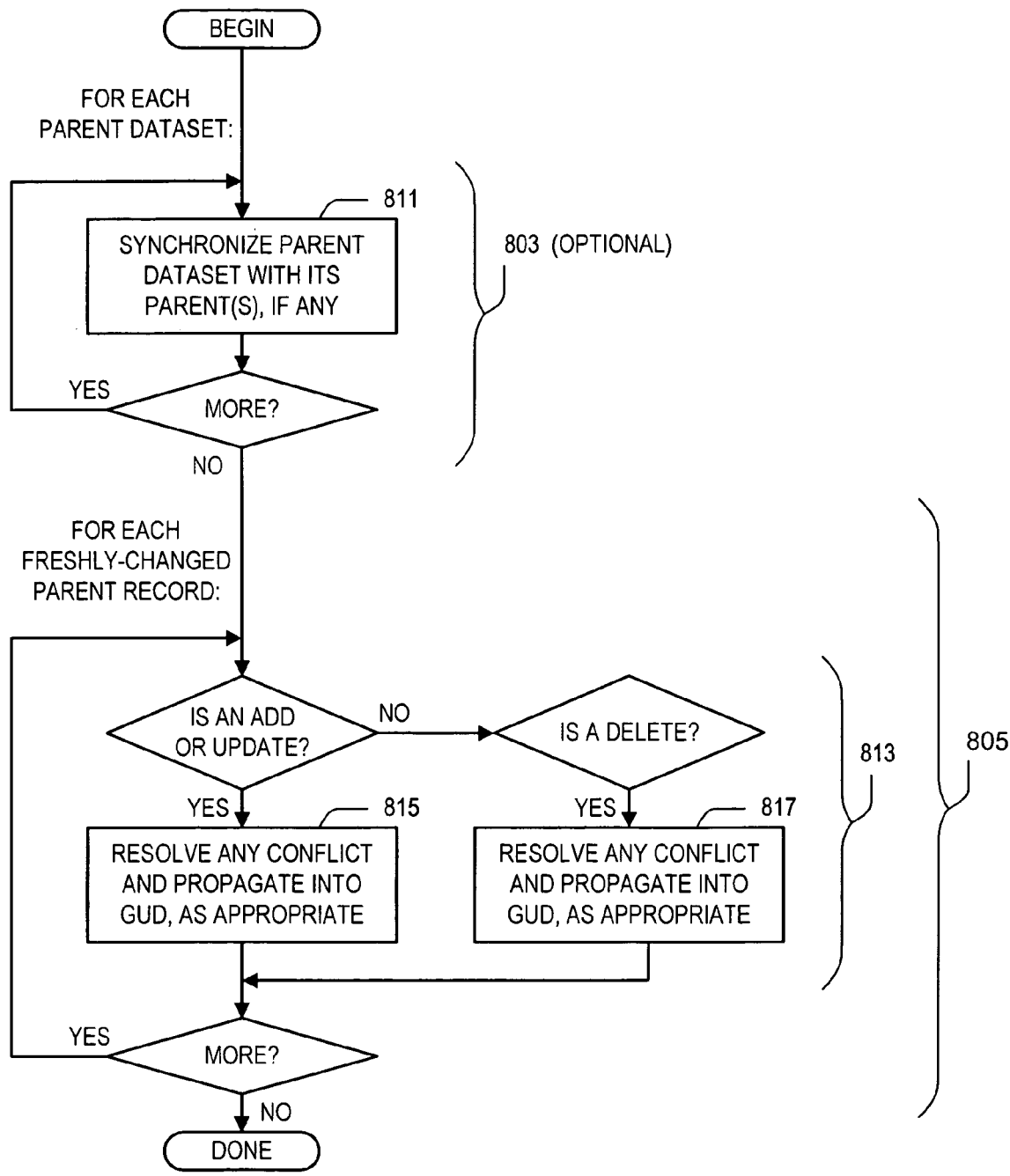
FIG. 8A is a flowchart that describes a method for synchronizing a particular child dataset with its parent records, to thereby make the child dataset up-to-date with respect to its parent records.

VIII. Method to Update (Synchronize) Child Dataset with Changes of Parent Dataset A. Introduction FIG. 8A is a flowchart that describes a method 411A for synchronizing a particular child dataset with its parent records, to thereby make the child dataset up-to-date with respect to its parent records. The method 411A is suitable for embodying the step 411 of FIG. 4A. As shown, the method 411A of FIG. 8A includes an optional preliminary phase 803 and a main phase 805. If the optional preliminary phase 803 is used, and the invoking user has sufficient privileges to modify the particular child dataset's ancestor dataset(s), then the method 411A will make the child dataset up-to-date not only with respect to its parent records but also with respect to all ancestor records (e.g., including grandparent and great-grandparent records, and so forth).

B. Optionally, First Synchronize Parent Records with all their Ancestors

In the optional preliminary phase 803, the Infomanager brings each of the child dataset's parent records up-to-date with respect to the parent record's ancestor records, assuming that the user has permission to update all of the child dataset's ancestor records as necessary to reflect any ancestor record's ancestor records. Because the user of the child dataset in general should not be expected to have permission to update all of its ancestor records (since ancestor datasets, in general, may be owned by other users), the method 411A by default does not execute the optional preliminary phase 803. However, as a non-default option, if the Infomanager determines from its permission records that the user of the child dataset, i.e., the user who invokes the method 411A, does have permission to modify the child dataset's parent records, then the Infomanager does execute the optional preliminary phase 803.

The optional preliminary phase 803 may be embodied as shown in FIG. 8A. As shown, in the preliminary phase 803, the Infomanager loops over all parent datasets. For each parent dataset, if the user has permission to modify the parent dataset, then the Infomanager, in a step 811, recursively invokes the method 411A to synchronize the parent dataset with the parent dataset's parent records. These recursive calls to the method 411A are invoked with arguments indicating that the preliminary phase 803 should be used at least for ancestor datasets for which the user has permission to modify. As mentioned above, in general, the Infomanager preferably does not use the optional preliminary phase 803.

C. Determine and Obtain Fresh Parent Changes, then Handle each One

1. Overview

In the main phase 805, the Infomanager determines which parent records include changes that are fresh with respect to the child dataset, and loops over each such freshly-changed parent record. Within the body 813 of the loop of the main phase 805, for each freshly-changed parent record, the Infomanager resolves any conflict that may exist with any local copy of the parent record, and propagates the parent change to the degree called for by the conflict resolution. More particularly, the Infomanager handles any addition or update of a parent record in a step 815, and the Infomanager handles any deletion of a parent record in a step 817. The main phase, including the steps 815 and 817 will be further discussed.

2. Determine and Obtain Fresh Parent Changes

As should already be clear from earlier discussion, any parent record is considered to have been freshly changed (e.g., updated, added, or deleted) in the main phase 805 if the changes have been made without the child dataset's known awareness—e.g., because the changes were made after a time at which the child dataset was most recently updated by its parent dataset in question. The Infomanager may obtain such freshly-changed records, for example, by invoking the step 515 of FIG. 5B to obtain freshly-updated, freshly-added, or freshly-deleted records that are inherited on a record level, and then invoking the step 517 of FIG. 5B to obtain freshly-updated, freshly-added, or freshly-deleted records that are inherited on a dataset level. (Recall that the steps of FIG. 5B may be invoked in a manner that produces even (logically-) deleted records.) In invoking the steps 515 and 517 of FIG. 5B, the Infomanager uses the freshness criteria as the data record filter. For example, the freshness criteria may be "modified after time X", wherein X is the time of the previous synchronization between the GUD and the parent dataset. Of course, for these invocations, the steps 515 and 517 would include and use the definition for modification time described above in connection with the step 707A of FIG. 7B. Namely, the modification time is the time of the record's local modification, for a locally-modified inherited record (e.g., for a local (possibly obsolete) copy of the parent record). For an inherited record that is not locally modified (e.g., an inherited record that is purely a record pointer), the modification time is the later of the time that the record pointer came into existence (e.g., when the Infomanager started a record-level entry for the child record in the GUD) and the modification time of the inherited record's parent record.

3. For Updates: Resolve Conflicts, Update, Notify, and Refresh

Figure 8B:
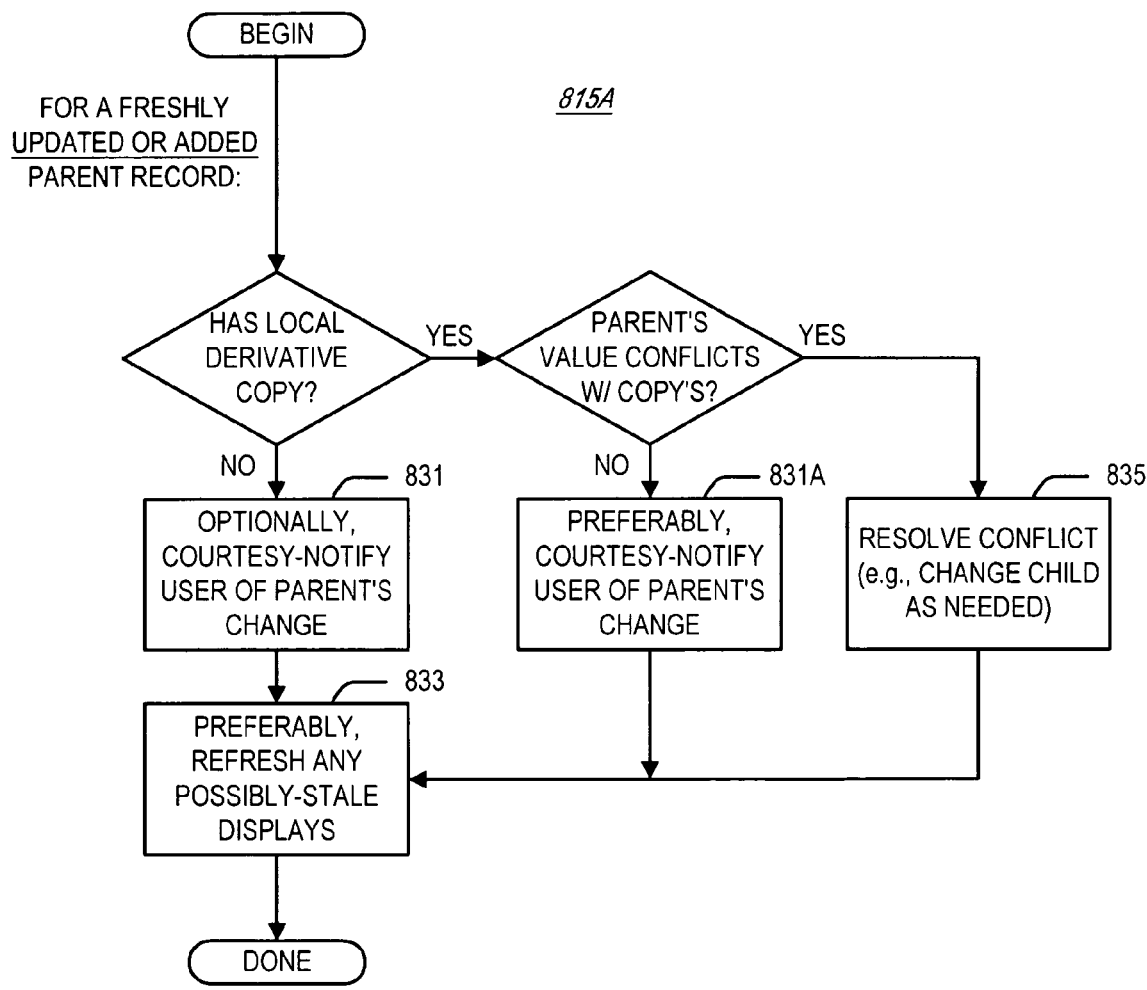
FIG. 8B is a flowchart that describes a method for synchronizing a freshly-updated or freshly-added parent record into the child dataset, subject to conflict resolution.

FIG. 8B is a flowchart that describes a method 815A for synchronizing a freshly-updated (i.e., as opposed to freshly-added or freshly-deleted) parent record into the child dataset, subject to conflict resolution. The method 815A is suitable for embodying the step 815 of FIG. 8A. Upon entering the method 815A, the child dataset either does, or does not, already include a local copy of the (pre-updated) parent record. Consider first the situation that the child dataset does not already include a local copy of the parent record. In this situation, the Infomanager needs not change the inheritance data structures in the child dataset because the child dataset can already access the freshly-updated parent record using either an existing record pointer or an existing dataset pointer of the child dataset, as described earlier in connection with the method 405A of FIG. 5A. As a courtesy to the user, the Infomanager optionally notifies the user (e.g., via a pop-up window (on a graphical user interface), or the like), in a step 831, that the parent record has changed. Further, in a step 833, the Infomanager preferably refreshes any display (or other consuming (i.e., Infomanager-invoking) entity) that is currently displaying (or otherwise using) the child dataset's information and that may be stale. (For example, a display that started displaying the child dataset before the modification time of the parent record is possibly stale. For another example, any display that displays the child dataset is possibly stale, in the absence of further checks or status information.) The refreshing may be performed, e.g., by re-transmitting the just-updated record to the display (or other consuming entity).

Next consider the situation that the child dataset does already include a local copy of the parent record. In this situation, the Infomanager compares the freshly-updated parent record's values with the local copy of the parent record. If the values are, in fact, non-conflicting (e.g., the values are identical in all relevant fields (e.g., all mapped fields)), then the Infomanager preferably courtesy-notifies the user, in a step 831A, that the parent record has changed but that no conflict exists because the parent matches the existing local copy. If the values of the parent record and the local copy are, in fact, conflicting (e.g., corresponding fields have different values), then the Infomanager performs conflict resolution in a step 835. Because the conflict involves a fresh change from the parent dataset, the Infomanager preferably uses manually-assisted conflict resolution in the step 835. This is in keeping with the Infomanager's preference, discussed earlier, for using manually-assisted conflict resolution, as opposed to automatic conflict resolution, for fresh changes from parent datasets. The Infomanager may, for example, conduct manually-assisted conflict resolution by displaying the fields of the conflicting parent and child records to the user, e.g., visually aligned, and accepting input from the user (e.g., mouse input) by which the user chooses winning record fields interactively. (See, for example, the incorporated commonly-owned U.S. Pat. No. 5,519,606 for its discussion of "point-and-shoot" manual assistance in conflict resolution.) Note that the manually-assisted conflict resolution in the step 835 generally inherently includes a notification to the user that the parent record has freshly changed.

4. For Additions: Resolve Conflicts, Update, Notify, and Refresh

The method 815A of FIG. 8B is also useful for synchronizing a freshly-added parent record into the child dataset. In general, a freshly-added parent record is a record that has been freshly added to a parent dataset that is inherited on a dataset level. For such a freshly-added parent record, the child dataset, in general, does not already include a local copy of the parent record. As a result, if the freshly-changed parent record in the method 815A is a freshly-added record, then there is no conflict, and the Infomanager merely does the following. The Infomanager preferably courtesy-notifies the user (e.g., via a pop-up window, or the like) of the added record, in the step 831, and preferably, in the step 833, refreshes any possibly-stale display (or other consuming entity) that is currently displaying (or otherwise using) the child dataset. Note that, while not shown in FIG. 8B, if the Infomanager knows that the child record of the freshly-added parent record is to participate in synchronization with alter-ego datasets, then the Infomanager will create a record-level entry and synchronization status fields for the new child record. This creation has already been mentioned above, in connection with implementation of the optional step 741 of FIG. 7B using the step 411 of FIG. 4A followed by the step 731 of FIG. 7B.

5. For Deletions: Stop Inheriting and Orphan or Delete any Local Copy

Figure 8C:
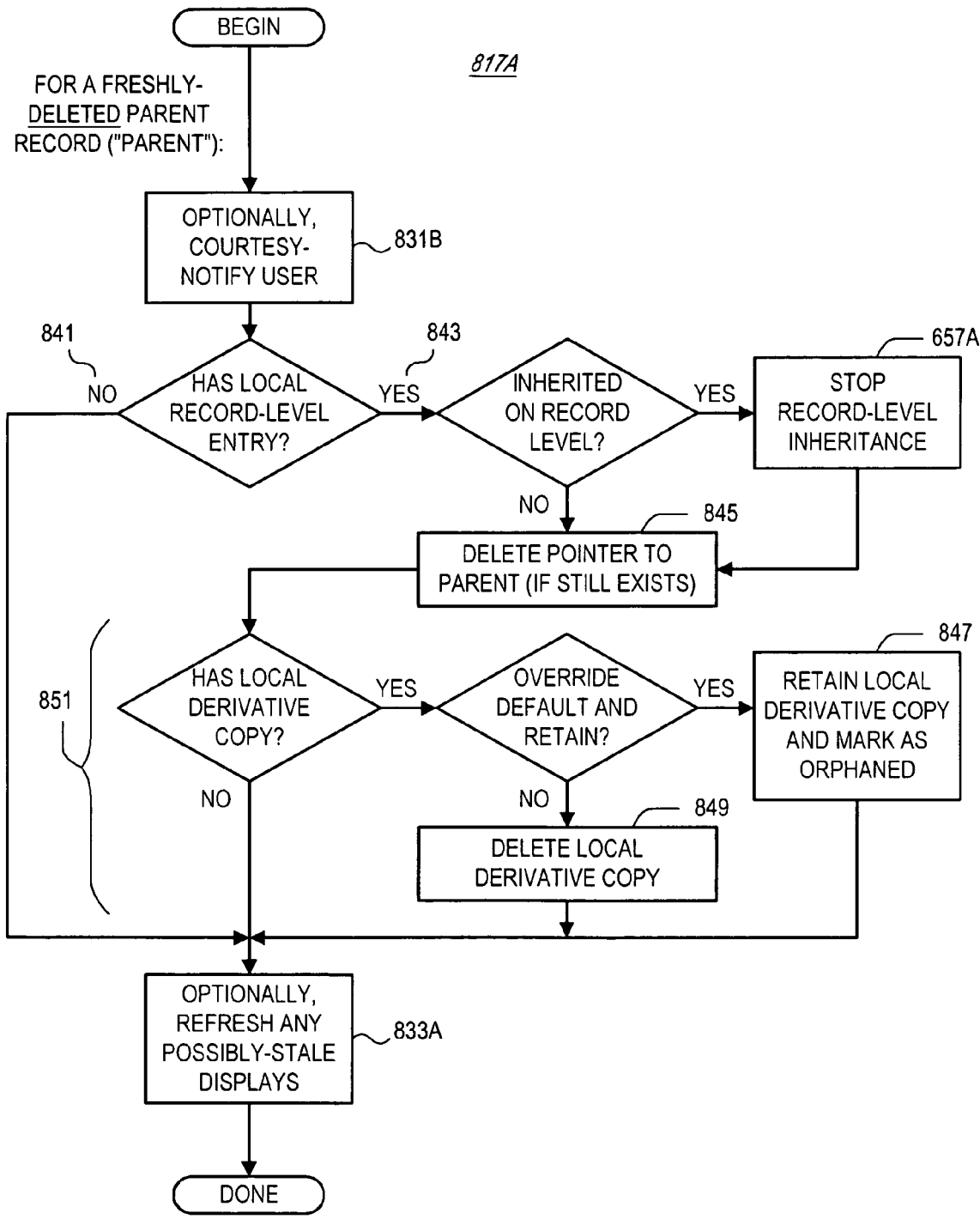
FIG. 8C is a flowchart that describes a method for synchronizing, into the child dataset, a fresh deletion of a parent record, subject to conflict resolution.

FIG. 8C is a flowchart that describes a method 817A for synchronizing, into the child dataset, a fresh deletion of a parent record, subject to conflict resolution. The method 817A is suitable for embodying the step 817 of FIG. 8A. In general, according to the method 817A, the Infomanager ensures that the child dataset stops inheriting the freshly-deleted parent record. If the child record had been locally modified in the child dataset, then the Infomanager gives the user the choice of also deleting (by default) the locally-modified copy of the child record or retaining (as an option) the locally-modified copy of the child record as a native record of the child dataset. The Infomanager also preferably informs the user of the deletion of the parent record.

The method 817A may be more formally described as follows, for the preferred embodiment of the Infomanager. In a step 831B, the Infomanager preferably courtesy-notifies the user of the deleted record. The Infomanager determines whether the child record of the freshly-deleted parent record has a record-level entry in the child dataset. If not (i.e., if the child record is inherited only on a dataset level, has not been locally-modified, and has never been prepared for synchronization with an alter ego-dataset), then the Infomanager needs not change the inheritance data structures in the child dataset and the Infomanager merely takes an execution path 841 to preferably refresh, in a step 833A, any possibly-stale display (or other consuming entity) that is currently displaying (or otherwise using) the child dataset.

If the child record of the freshly-deleted parent record does have a record-level entry in the child dataset, then the Infomanager takes an execution path 843 to perform the following actions. If the freshly-deleted parent record is being inherited on a record level, then the Infomanager stops inheriting the parent record on a record level, in a step 657A (which may be implemented as an instance of the step 657 of FIG. 6C). The Infomanager deletes from the child record any record-level pointer to the parent record, in a step 845. By these steps, the child dataset no longer inherits the parent record. The Infomanager then handles any local copy of the parent record in a step 851. More particularly, if the (former) child record includes a local copy of the parent record (e.g., had been locally modified), then the Infomanager optionally offers the user an opportunity to retain the local copy as a no-longer-inherited (i.e., native) (i.e., "orphaned") record. If the user accepts the offer to retain the local derivative copy of the freshly-deleted parent record, then the Infomanager does not delete the local derivative copy and instead, in a step 847 within the step 851, retains the local derivative copy as a now-native record that has been orphaned from the parent dataset (and marks the (former) child record, if necessary, as no longer being inherited, e.g., on a dataset level). If the user does not accept the offer to retain the local derivative copy, then the Infomanager deletes, in a step 849 within the step 851, the local derivative copy. After the step 851, the Infomanager preferably refreshes, in the step 833A, any possibly-stale display (or other consuming entity) that is currently displaying (or otherwise using) the child dataset.

IX. Miscellaneous Supplemental Discussion (Detailed)

A. Stopping Inheritance of a Specific Record (i.e., Record-Level Inheritance)

Figure 9A:
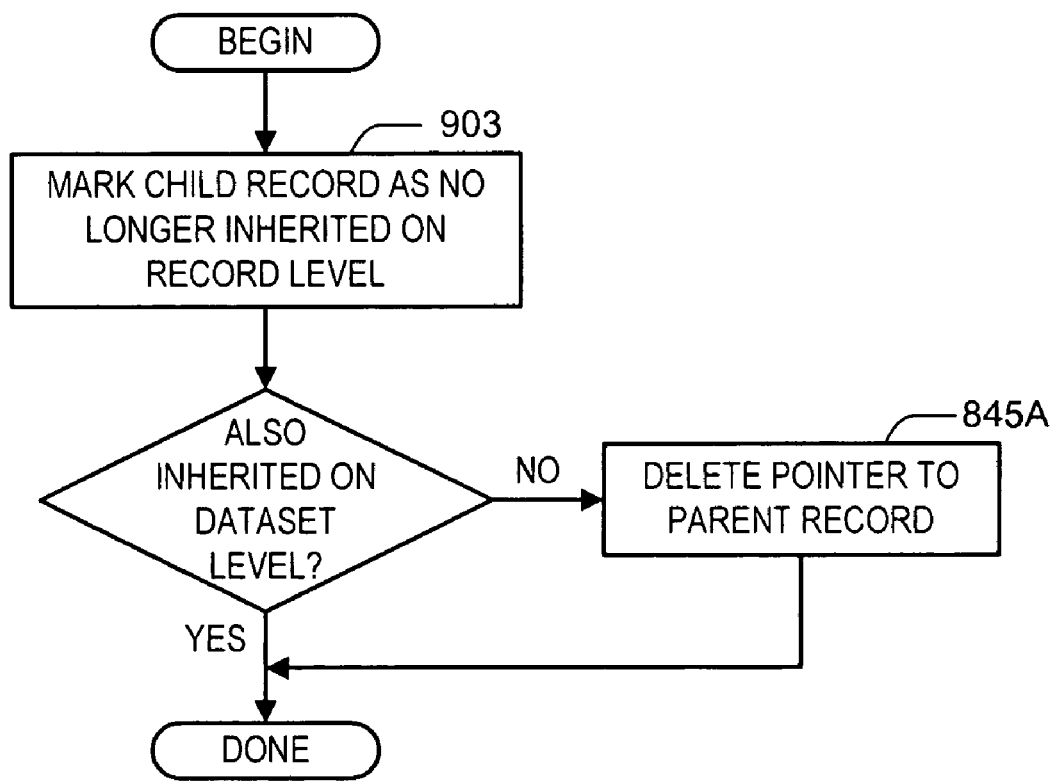
FIG. 9A is a flowchart that describes a method for stopping record-level inheritance of a parent record by a child record.

FIG. 9A is a flowchart that describes a method 657B for stopping record-level inheritance of a parent record by a child record. The method 657B is suitable for embodying the step 657 of FIG. 6C and the step 657A of FIG. 8C. The method 657B is used by the preferred embodiment of the Infomanager. As shown in FIG. 9A, to stop inheriting a parent record on a record level, the Infomanager marks the child record as no longer inheriting the parent record on a record level, in a step 903. The Infomanager determines whether the child record also inherits the parent record on a dataset level. If not, then the Infomanager deletes, in a step 845A, the child record's record pointer to the parent record. At this point, the child record no longer inherits the parent record on a record level. If the child record has a local derivative copy of the parent record, then the Infomanager would separately determine what to do with the local derivative copy. (See, e.g., the step 851 of FIG. 8C.)

B. Stopping Inheritance of an Entire Dataset (i.e., Dataset-Level Inheritance)

Figure 9B:
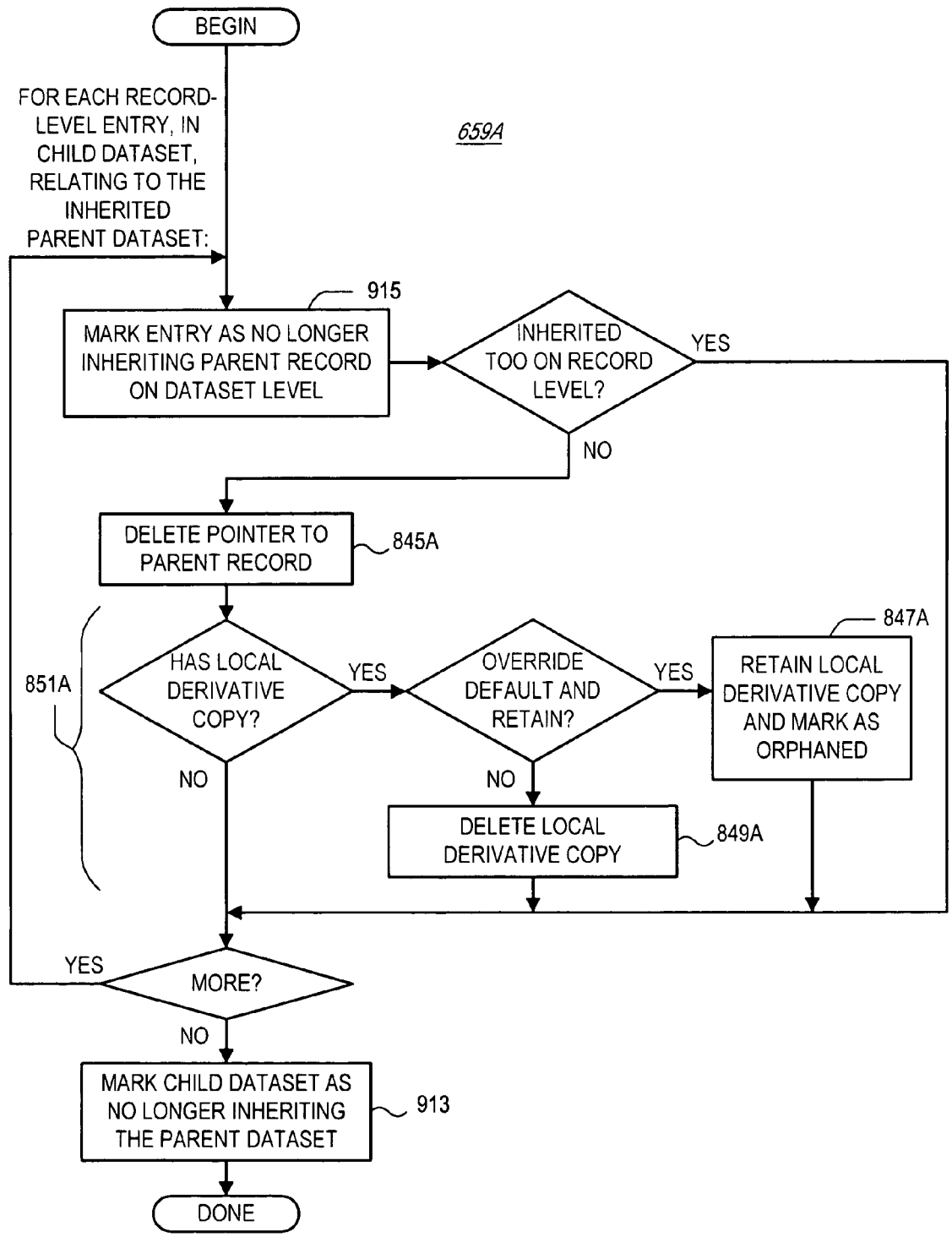
FIG. 9B is a flowchart that describes a method for stopping dataset-level inheritance of a parent dataset by a child dataset.

FIG. 9B is a flowchart that describes a method 659A for stopping dataset-level inheritance of a parent dataset by a child dataset. The method 659A is suitable for embodying the step 659 of FIG. 6C. The method 659A is used by the preferred embodiment of the Infomanager. As shown in FIG. 9B, the method 659A culminates in a step 913 in which the Infomanager marks the child dataset as no longer inheriting the parent dataset (i.e., on a dataset level). The method 659A also includes steps for dealing with record-level entries in the child dataset for child records of the parent dataset's records. More particularly, for each such record-level entry in the child dataset, the Infomanager, in a step 915, marks the entry as no longer inheriting its parent record on a dataset level. The Infomanager determines whether the child record is also inheriting its parent record on a record level. If so, then the Infomanager does nothing further (i.e., does not stop inheriting the parent record on a record level and does not disturb any local copy of the parent record). If not (i.e., if the child record is not also inheriting its parent record on a record level), then the Infomanager, in a step 845A, deletes the local entry's record pointer to the parent record, and, in a step 851A, handles any local derivative copy of the parent record. More particularly, if the (former) child record includes a local copy of the parent record (e.g., had been locally modified), then the Infomanager optionally offers the user an opportunity to retain the local copy as a no-longer-inherited (i.e., native) (i.e., "orphaned") record. If the user accepts the offer to retain the local derivative copy of the freshly-deleted parent record, then the Infomanager does not delete the local derivative copy and instead, in a step 847A within the step 851A, retains the local derivative copy as a now-native record that has been orphaned from the parent dataset. If the user does not accept the offer to retain the local derivative copy, then the Infomanager deletes, in a step 849A within the step 851A, the local derivative copy.

C. Example of Data Structures for Synchronizing GUD with Alter-Ego Datasets

As has been discussed, in the step 731 of FIG. 7B, in synchronizing the GUD, including child records within the GUD, with the GUD's alter-ego datasets, the Infomanager establishes a record-level entry in the GUD for each inherited record that does not already have a record-level entry. It may be helpful to partially illustrate the result of the step 731 with an example scenario. The example scenario continues an earlier example that was shown in FIG. 6B. In the example scenario, the user, Alice, has just finished modifying her personal dataset, the GUD, into the state 430A as shown in FIG. 6B. Then, Alice invokes the method 407A of FIG. 7B to synchronize the GUD, including its inherited records, with at least one of the GUD's alter-ego dataset(s).

Figure 9C:
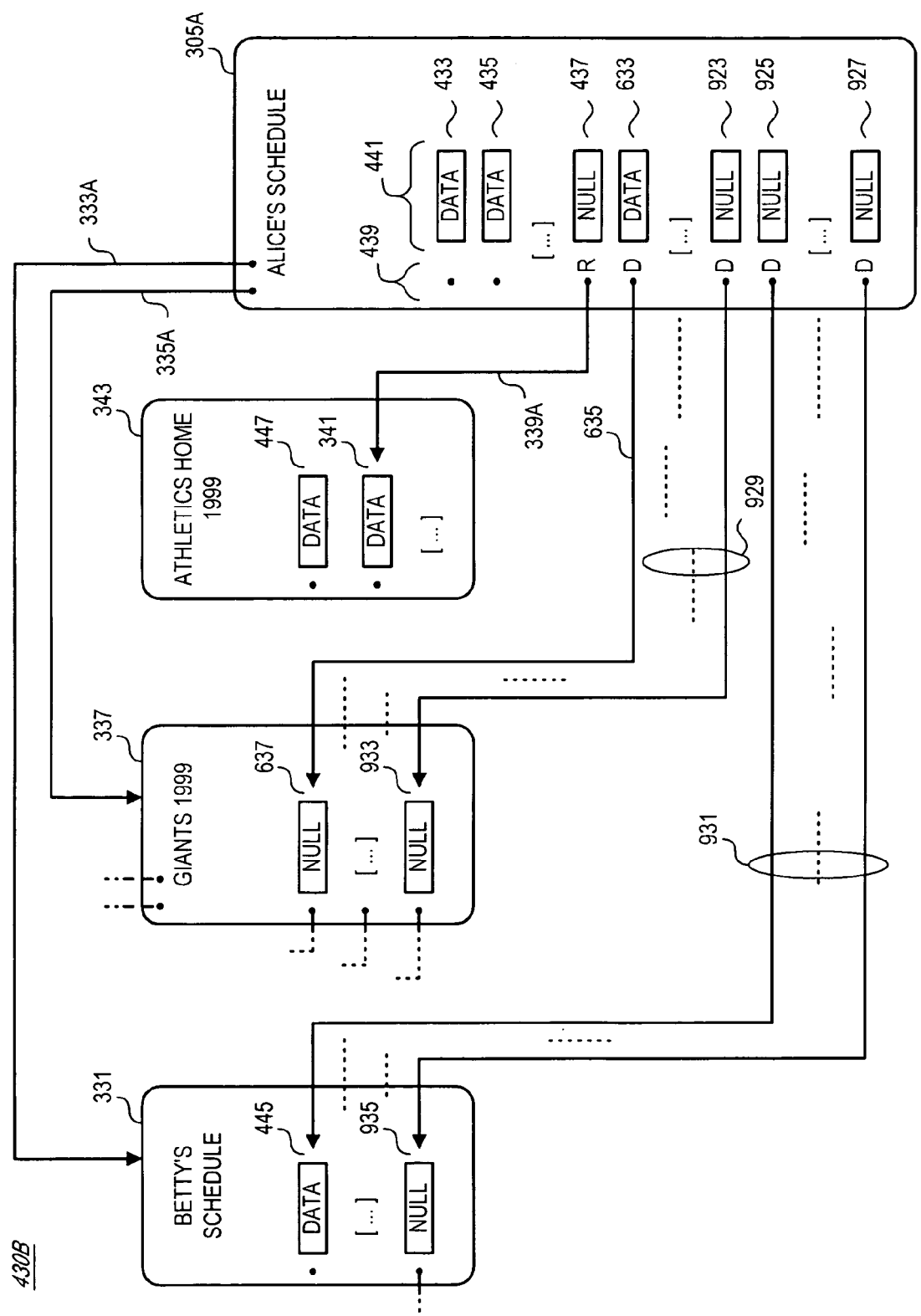
FIG. 9C is a block diagram that depicts, in part, a changed state of the datasets of FIG. 6B that results from creation of record-level entries in preparation for synchronizing one of the datasets according to the inheritance-aware method of FIG. 7B.

FIG. 9C is a block diagram that depicts, in part, a state 430B of Alice's GUD and its parent datasets after creation of record-level entries by the Infomanager in the step 731 of FIG. 7B. FIG. 9C is self-explanatory, but it may be helpful to highlight a few features. In particular, note that new record-level entries, including entries 923, 925, and 927, have been created by the Infomanager in Alice's GUD 305A for child records, inherited on only a dataset level, that previously lacked local record-level entries. Note that these new record-level entries include newly-created record pointers 929 and 931 to parent records. Note that the pointed-to parent records also include new record-level entries, including record-level entries 933 and 935, that have been created, in the step 731 of FIG. 7B, by the Infomanager in the parent datasets 331 and 337, respectively.

D. Alternative Embodiment for Recursively Synchronizing Ancestor Records

Figure 9D:
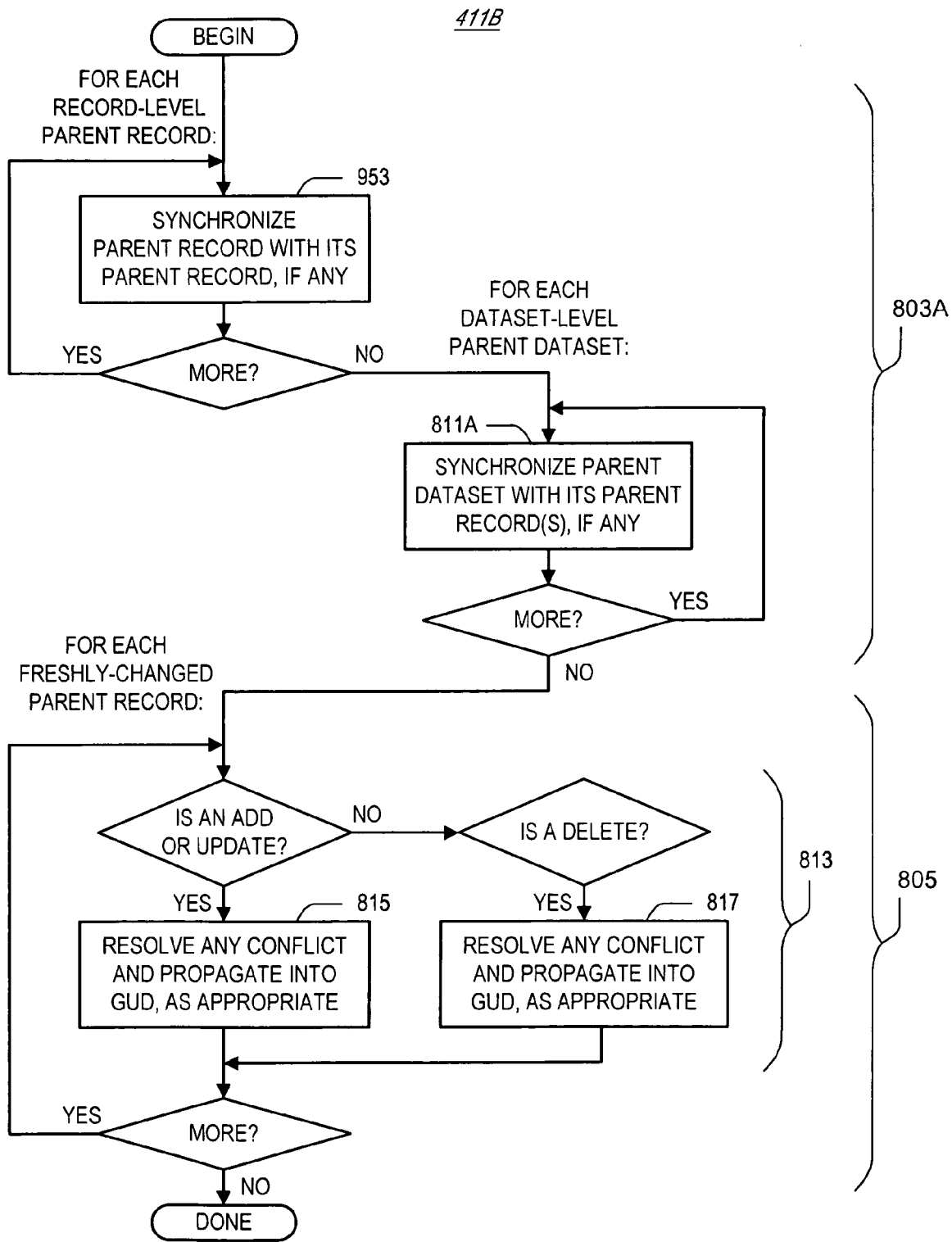
FIG. 9D is a flowchart that describes a method, that is an alternative to the method of FIG. 8A, for synchronizing a particular child dataset with its parent records, to thereby make the child dataset up-to-date with respect to its parent records.

FIG. 9D is a flowchart that describes a method 411B for synchronizing a particular child dataset with its parent records, to thereby make the child dataset up-to-date with respect to its parent records. The method 411B is suitable for embodying the step 411 of FIG. 4A, and is an alternative embodiment to the method 411A of FIG. 8A. As shown in FIG. 9D, the method 411B includes an optional preliminary phase 803A and the main phase 805. The main phase 805 is simply the main phase 805 of the method 411A of FIG. 8A. The optional preliminary phase 803A of FIG. 9D is an alternative to the optional preliminary phase 803 of the method 411A of FIG. 8A. If the optional preliminary phase 803A is used, and the invoking user has sufficient privileges to modify ancestor records of the particular child dataset, then the method 411B will make the child dataset up-to-date, not only with respect to its parent records, but also with respect to ancestor records in general (e.g., including grandparent and great-grandparent records, and so forth).

As shown in FIG. 9D, in the optional preliminary phase 803A, the Infomanager first invokes a step 953 for each parent record that is inherited on a record level, and for which the user has modification privileges, to bring each parent record up-to-date relative with that parent record's ancestors. Next, the Infomanager loops over all parent datasets that are inherited on a dataset level. For each such parent dataset inherited on a dataset level, if the user has permission to modify the parent dataset, then the Infomanager, in a step 811A, recursively invokes the method 411B to synchronize the parent dataset with the parent dataset's parent records. These recursive calls to the method 411B are invoked with arguments indicating that the preliminary phase 803A should be used at least for ancestor datasets and records for which the user has permission to modify. In general, the Infomanager preferably does not use the optional preliminary phase 803A.

The step 953 may be embodied as follows to bring a particular record up-to-date with the record's ancestors, if any. If the particular record has no parent record whatsoever, then the step 953 simply finishes (i.e., returns). If the particular record has a parent record for which the user has modification privileges, then the step 953 first calls itself recursively to bring the particular record's parent record up-to-date with respect to its ancestor records. After the recursive call, or if there was no recursive call, the Infomanager calls the step 813 of the method 411A of FIG. 8A to bring the particular record up-to-date with respect to the particular record's parent record. (In each invocation of the step 813, the particular record's (i.e., child record's) dataset is considered to be the "GUD" for that invocation.)

E. Conflict Resolution During Synchronization

Conflict resolution has already been discussed, with reference, for example, to the step 703A of FIG. 7B, and with reference, for example, to certain incorporated, commonly-owned patent applications. As was mentioned, any conflict involving a native GUD record (i.e., non-inherited) is preferably resolved automatically (e.g., by a "latest change wins" rule). Automatic conflict resolution may be performed by the Infomanager at the GUD, in a specific embodiment, according to the following pseudocode:

1) for a fresh record deletion received from the client:
   A) if there is no corresponding GUD record (e.g., the record was added and deleted in the client after the previous synchronization), ignore the deletion.
   B) if a corresponding GUD record exists (i.e., not A) and is already deleted (i.e., logically deleted), ignore the client's deletion (but if the client supplied a client deletion time (e.g., a user-deletion time) and that deletion time is later than the GUD record's priority time, replace the GUD record's priority time with the client record's deletion time.)
   C) if a corresponding GUD record exists (i.e., not A) and is not yet deleted (i.e., not B) and the latest priority time for the corresponding GUD record is not later than the deletion time for the client's deleted record (or not later than the last sync time, if deletion time is unavailable), then delete (i.e., logically delete) the corresponding GUD record.
   D) if a corresponding GUD record exists (i.e., not A) and is not yet deleted (i.e., not B) and the latest priority time for the corresponding GUD record is later than the deletion time for the client's deleted record (or later than the last sync time, if deletion time is unavailable) (i.e., not C), then go into manual conflict resolution, and:
      i) if the user does not instruct in manual conflict resolution that the deletion should be undone, then delete the corresponding GUD record.
      ii) if the user instructs in manual conflict resolution the deletion should be undone (i.e., not i), then delete the GUD record but first add a copy of the GUD record to the GUD as an addition, which will be propagated to all clients in the outbound phase.
2) for a modified or added record from the client:
   A) if no corresponding GUD record exists, then the record from the client is an added record, go to 3.
   B) if a corresponding GUD record exists (i.e., not A), and the corresponding GUD record is not already deleted, then compare the priority times of the client record and the GUD records to determine a winner for each field and merge the records, with the winning priority time(s) becoming the priority time of the merged record. (Preferably, field-by-field priorities are kept in the GUD and are used by the Infomanager in merging records. Generally, the client's record keeps priority time (e.g., modification time) on a record level and not a field level, so the single record-level priority time is used as the priority time for all the client record's fields.)
   C) if a corresponding GUD record exists (i.e., not A), and the corresponding GUD record is already deleted (i.e., not B), then.
      i) if the (latest) priority time for the client record is not later than the delete time for the corresponding GUD record, then ignore the client modification or addition; in this way, in the outbound phase, the client record will be deleted.
      ii) if the (latest) priority time for the client record is later than the delete time for the corresponding GUD record (i.e., not i), then go into manual conflict resolution, and:
         a) if the user instructs in manual conflict resolution that the GUD deletion should be "undone", then add a copy of the client record to the GUD as an addition to be propagated to all clients and otherwise ignore the client modification. In this way, in the outbound phase the client record will be deleted but a new copy will replace it as an addition.
         b) otherwise (i.e., not a) (i.e., default), ignore the client modification, and make necessary markings (e.g., change the delete time of the GUD record to the current time) such that in the outbound phase the client record will be deleted.
3) for an added record (i.e., has no corresponding GUD record) from the client:
   A) if the added alter-ego record would not duplicate an existing GUD record, then add a copy of the client record into the GUD and map the new GUD record to the added alter-ego record.
   B) if the added alter-ego record would duplicate an existing GUD record (i.e., not A), and the existing record is not an inherited record, then the added record should somehow be merged with the inherited record, therefore choose one of the following actions:
      i) by default, add a new GUD record, map the new GUD record to the added alter-ego record, merge the data of the existing GUD record and the data of the fresh alter-ego record into either the new GUD record or the existing GUD record, and then delete the other of the new GUD record or the existing GUD record. In this way, one of the two GUD records will be deleted, to leave only a single and updated GUD record of the two GUD records. In the outbound phase, the alter-ego dataset will consequently be made to have only a single counterpart to the single and updated GUD record (e.g., the counterpart of the deleted GUD record will be deleted, and if necessary, the counterpart of the merged-into GUD record will be updated).
      ii) alternatively, as an option, if the existing record is not yet mapped to the client, and there are no known barriers against mapping the existing record to the client (e.g., barriers such as respective mappings to different records in a third-party dataset), then map the added record to the client and treat the added alter-ego record as a modified record and go to 2.

C) if the added record would duplicate an existing record (i.e., not A) and the existing record is an inherited record (i.e., not B), then start manual conflict (duplicate) resolution, and:
  i) if the user instructs to allow the duplication to exist, then add a new GUD record that is a copy of the added alter-ego record and mark the new GUD record as corresponding to the client's added record.
  ii) if the user instructs to remove the duplication by merging into the inherited record, then either:
    a) add a new GUD record, map the new GUD record to the added client record, merge the added client record and the old GUD record into the old GUD record (e.g., via local modification), and delete the new GUD record; or
    b) alternatively, as an option, if the existing GUD record is not yet mapped to any client record, and there are no known barriers against mapping the existing GUD record to the added client record (e.g., barriers such as respective mappings to different records in a third-party dataset), then map the added client record to the existing GUD record and treat the added alter-ego record as a modified record and go to 2.

While the invention is described in some detail with specific reference to a single, preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. A method of inheriting data from a second dataset into a first dataset, the method comprising the steps of:
  receiving a first user input, the first user input selecting a first data item from the second dataset for inheritance into the first dataset;
  placing a first pointer in the first dataset, pointing to a first record in the second dataset that contains the inherited first data item; and
  when processing data in the first dataset, using the first pointer to locate the inherited first record in the second dataset, and including the inherited first data item from the second dataset in the processing of data in the first dataset;
  wherein the user cannot modify the second dataset and the first dataset is a personal dataset in which the user can annotate the inherited first data item;
  synchronizing the first dataset with the alter-ego dataset and propagating the first data item from the second dataset, so that after the synchronization the alter-ego dataset has a copy of the first data item from the second dataset,
  wherein a local copy of the first data item is stored in the first dataset prior to the synchronization with the alter-ego dataset;
  receiving an update to the first data item from the alter-ego dataset during a further synchronization; and
  entering the update from the alter-ego dataset into the local copy of the first data item.

2. The method of claim 1, wherein the processing of data in the first dataset is responsive to a user's selection of data items for display, and the method further comprises the following steps:
  receiving a second user input, the second user input indicating selected data items to be displayed;
  establishing a filter for identifying the selected data items to be displayed;
  applying the filter to the first dataset;
  applying the filter to the first data item, using the first pointer to locate the first data item; and
  displaying data from the first dataset and from the first data item that satisfy the filter requirements.

3. The method of claim 1 further comprising the steps of:
  receiving a third user input, the third user input indicating changes to be made to the first data item;
  creating a local copy of the first data item in the first dataset; and
  applying the user changes to the local copy of the first data item.

4. The method of claim 3 further comprising the step of retaining the first pointer, pointing to the first record in the second dataset.

5. The method of claim 3 wherein, when processing data in the first dataset, the method includes the local copy of the first data item in the processing of data in the first dataset.

6. The method of claim 1 further comprising the steps of:
  receiving a fourth user input, the fourth user input selecting a third dataset and indicating that the entire third dataset is to be inherited into the first dataset;
  placing a second pointer in the first dataset, pointing to the third dataset; and
  when processing data in the first dataset, using the second pointer to locate the third dataset, and including the data in the third dataset in the processing of data in the first dataset.

7. The method of claim 1 further comprising the steps of:
  receiving a fifth user input, the fifth user input selecting a second data item from the second dataset for inheritance into the first dataset, wherein the second data item has been inherited from a fourth dataset into the second dataset, the second dataset including a fourth pointer to a second record in the fourth dataset that contains the second data item;
  placing a third pointer in the first dataset, pointing to the fourth pointer in the second dataset; and
  when processing data in the first dataset, using the third pointer to locate the fourth pointer, using the fourth pointer to locate the second data item, and including the second data item from the fourth dataset in the processing of data in the first dataset.

8. The method of claim 7 further comprising the steps of:
  receiving a sixth user input, the sixth user input selecting the fourth dataset and indicating that the entire fourth dataset is to be inherited into the first dataset;
  placing a fifth pointer in the first dataset, pointing to the fourth dataset; and
  when processing data in the first dataset, using the fifth pointer to locate the fourth dataset, and including the data in the fourth dataset in the processing of data in the first dataset, but also detecting that the second data item has been inherited into the first dataset both through the second dataset and directly from the fourth dataset, and avoiding processing the second data item a second time.

9. The method of claim 1 further comprising the following steps:

receiving a seventh user input, the seventh user input indicating a change to be made to the first data item;

applying the user change to the local copy of the first data item;

receiving an update to the first data item from the alter-ego dataset during the synchronization;

resolving conflicts between the update to the first data item from the alter-ego dataset and the user change received in the seventh user input; and entering the update from the alter-ego dataset into the local copy of the first data item and propagating the user change from the seventh user input to the after-ego dataset as appropriate, based on the conflict resolution.

10. A method of processing data in a first dataset and synchronizing the first dataset with an alter-ego dataset, the data in the first dataset including data that is native to the first dataset, data that is inherited on a record level from a second dataset, data that is inherited on a record level from the second dataset that is further inherited on a record level from a third dataset, data that is inherited on a dataset level from the third dataset, and data that is inherited from the second dataset and that is modified locally, the method comprising the steps of:

processing the data in the first dataset that are native to the first dataset;

processing the data in the first dataset that are inherited from the second dataset and for which a local copy has not already been processed;

processing the data in the first dataset that are inherited from the third dataset and that have not already been processed during the processing of data that are inherited from the second dataset;

synchronizing the first dataset with the alter-ego dataset and propagating the first data item from the second dataset, so that after the synchronization the alter-ego dataset has a copy of the first data item from the second dataset, wherein a local copy of the first data item is stored in the first dataset prior to the synchronization with the alter-ego dataset;

receiving an update to the first data item from the alter-ego dataset during a further synchronization; and entering the update from the alter-ego dataset into the local copy of the first data item.

11. The method of claim 10, wherein the data in the first dataset further includes data that is inherited from the third dataset and that is modified locally, and the step of processing the data in the first dataset that are inherited from the third dataset excludes data for which a local copy has already been processed.

12. The method of claim 10, wherein the processing of data in the first dataset includes displaying a portion of the data from the first dataset.

13. A system for inheriting data into a first dataset from a plurality of other datasets, the system comprising:

a plurality of native data in the first dataset;

a first pointer in the first dataset, the first pointer pointing to a first data item in a second dataset to inherit the first data item from the second dataset into the first dataset on a record level;

a second pointer in the first dataset, the second pointer pointing to a third pointer in a third dataset, the third pointer pointing to a second data item in a fourth dataset to inherit the second data item from the third dataset into the first dataset on a record level, the second data item further being inherited from the fourth dataset into the third dataset on a record level; and a fourth pointer in the first dataset, the fourth pointer pointing to a fifth dataset to inherit the fifth dataset into the first dataset on a dataset level, wherein, when the system processes data in the first dataset, the system processes data that is native to the first dataset, along with the first data item, the second data item and data from the fifth dataset.

14. The system of claim 13, wherein the second dataset and the third dataset are the same dataset.

15. The system of claim 13, wherein the second dataset and the fifth dataset are the same dataset.

16. The system of claim 13, wherein, if a user of the first dataset attempts to modify the first data item, the system creates a local copy of the first data item in the first dataset and modifies the local copy, instead of the first data item in the second dataset.

17. The system of claim 13, wherein, when the system processes data in the first dataset, the system detects a duplicated inheritance of a data item and avoids processing the data item multiple times.

18. The system of claim 13 further comprising a synchronizer and an alter-ego dataset, the synchronizer synchronizing the first dataset with the alter-ego dataset, including the data that is native to the first dataset, the first data item, the second data item, and data from the fifth dataset.

19. A method of inheriting data into a first dataset from one or more ancestor datasets and of synchronizing data between the first dataset and one or more alter-ego datasets, the method comprising the steps of:

receiving a first user input, the first user input selecting a first data item from a first ancestor dataset for inheritance into the first dataset; and performing a first synchronization of at least a portion of the first dataset with at least a portion of a first alter-ego dataset, including sending a copy of the first data item to the first alter-ego dataset for inclusion in the first alter-ego dataset as a first alter-ego copy of the first data item;

wherein the user cannot modify the first ancestor dataset and the first dataset is a personal dataset in which the user can annotate the inherited first data item;

receiving at the first alter-ego dataset a first user change to the alter-ego copy of the first data item;

performing a second synchronization between the first dataset and the first alter-ego dataset, including receiving at the first dataset the first user change to the first data item; and entering the first user change into a local copy of the first data item at the first dataset.

20. The method of claim 19, wherein the step of making the local copy of the first data item in the first dataset occurs before the first synchronization between the first dataset and the first alter-ego dataset.

21. The method of claim 19 further comprising the steps of:

receiving at the first alter-ego dataset a second user change to the alter-ego copy of the first data item;

beginning a third synchronization between the first dataset and the first alter-ego dataset;

receiving at the first dataset the second user change to the first data item;

detecting a third change to the first data item in the first ancestor dataset;

making a local copy of the first data item in the first dataset;

performing a conflict resolution between the second user change to the first data item and the third change to the first data item; and completing the third synchronization by entering the second user change into the local copy of the first data item, entering the third change into the local copy of the first data item, and propagating the third change to the first alter-ego dataset, as appropriate, based on the conflict resolution.

22. The method of claim 19 further comprising the steps of:

receiving at the first dataset a fourth user change to the first data item;

making a local copy of the first data item in the first dataset;

entering the fourth user change to the first data item into the local copy of the first data item;

receiving at the first alter-ego dataset a fifth user change to the alter-ego copy of the first data item;

beginning a fourth synchronization between the first dataset and the first alter-ego dataset;

receiving at the first dataset the fifth user change to the first data item;

performing a conflict resolution between the fourth user change to the first data item and the fifth user change to the first data item; and completing the fourth synchronization by entering the fifth user change into the local copy of the first data item, and propagating the fourth user change to the first alter-ego dataset, as appropriate, based on the conflict resolution.

23. The method of claim 19 further comprising the step of placing a first pointer in the first dataset, pointing to the first data item in the first ancestor dataset.

24. The method of claim 19 further comprising the step of displaying a portion of the first dataset to a user, including the first data item.

25. A method of maintaining the synchronized state of at least one non-public or personal dataset including one or more data items that are inherited from a public dataset, the method including:

receiving a user input specifying at least one public data item in a public dataset to be selectively inherited into the non-pubic dataset, wherein the public dataset is not modifiable by the user;

inheriting the public data item into the personal dataset and establishing an inheritance-aware record-level entry for the inherited public data item; and when synchronizing the personal dataset, resolving a change in the public dataset to the inherited public data item and an annotation in the personal dataset to the inherited public data item, whereby the annotation remains associated with the changed inherited public data.

26. A method of maintaining the synchronized state of two non-public datasets, where one is a personal dataset and another is a portable alter-ego of the personal dataset, the non-public datasets including one or more data items that are inherited from a public dataset, the method including:

receiving a user input specifying at least one public data item in a public dataset to be selectively inherited into the non-pubic datasets, wherein the public dataset is not modifiable by the user;

inheriting the public data item into the personal dataset and establishing an inheritance-aware record-level entry for the inherited public data item;

propagating the inherited public data item into the portable alter-ego dataset, without any need for the portable alter-ego dataset to distinguish between native data entries and the inherited public data item; and when synchronizing the personal dataset, resolving a change in the public dataset to the inherited public data item and at least one annotation in the personal dataset and the alter-ego dataset to the inherited public data item, whereby the annotation remains associated with the changed inherited public data.

* * * * *